(12) United States Patent
Klinstein et al.

(10) Patent No.: US 9,914,263 B2
(45) Date of Patent: *Mar. 13, 2018

(54) ULTRASONIC PRESS WITH AUTOMATIC SPEED CHANGES IN ADVANCING MOVEMENT OF WELDING STACK

(71) Applicant: Dukane IAS, LLC, St. Charles, IL (US)

(72) Inventors: Leo Klinstein, Glenview, IL (US); Paul Golko, Crystal Lake, IL (US); William E. Jurkowski, Wheaton, IL (US)

(73) Assignee: Dukane IAS, LLC, St. Charles, IL (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/472,084

(22) Filed: Aug. 28, 2014

(65) Prior Publication Data

US 2014/0367019 A1    Dec. 18, 2014

Related U.S. Application Data

(63) Continuation of application No. 14/471,895, filed on Aug. 28, 2014, now Pat. No. 9,144,937, which is a
(Continued)

(51) Int. Cl.
| | |
|---|---|
| *B29C 65/08* | (2006.01) |
| *B29C 65/00* | (2006.01) |
| *B23K 20/10* | (2006.01) |

(52) U.S. Cl.
CPC ........... *B29C 65/08* (2013.01); *B23K 20/10* (2013.01); *B29C 66/1122* (2013.01);
(Continued)

(58) Field of Classification Search
CPC ..... B29C 65/08; B29C 66/944; B29C 66/951; B29C 66/9511; B29C 66/9512;
(Continued)

(56) References Cited

U.S. PATENT DOCUMENTS

| | | | |
|---|---|---|---|
| 4,179,059 A | 12/1979 | Chang et al. | 228/103 |
| 4,340,166 A | 7/1982 | Bilane et al. | 228/179 |

(Continued)

FOREIGN PATENT DOCUMENTS

| | | | |
|---|---|---|---|
| DE | 4120245 | 1/1992 | B29C 65/08 |
| DE | 4026711 | 2/1992 | B23Q 5/28 |

(Continued)

OTHER PUBLICATIONS

Veröffentlichung des Zentralverbandes der Elektrotechnik- und Elektronikindustrie e.V. (ZVEI): Fügen von Formteilen und Halbzeugen aus thermoplastischen Kunststoffen mit Ultraschall, 1985, Fachverband Elektroschweißen, Frankfurt, DEXP00205090212405 (56 pages).

(Continued)

*Primary Examiner* — George Koch
(74) *Attorney, Agent, or Firm* — Nixon Peabody LLP

(57) ABSTRACT

An ultrasonic welding system includes a movable ultrasonic welding stack for applying vibrational energy to a workpiece. A motion control system controls the motion of the ultrasonic welding stack and one or more sensors sense a control variable and output a corresponding control signal. A controller provides control inputs, based on the control signal, to the motion control system and causes, following initiation of a welding operation, an automatic change of speed of motion of the ultrasonic welding stack. The automatic change of the speed is a function of at least one control variable until the control variable reaches a predetermined value.

27 Claims, 16 Drawing Sheets

Related U.S. Application Data continuation-in-part of application No. 14/209,273, filed on Mar. 13, 2014, now Pat. No. 9,849,627, which is a continuation of application No. 13/245,021, filed on Sep. 26, 2011, now Pat. No. 8,720,516, which is a continuation of application No. 12/418,093, filed on Apr. 3, 2009, now Pat. No. 8,052,816, which is a continuation-in-part of application No. 11/800,562, filed on May 7, 2007, now Pat. No. 7,819,158.

(60) Provisional application No. 61/042,574, filed on Apr. 4, 2008, provisional application No. 60/798,641, filed on May 8, 2006.

(52) U.S. Cl.
CPC ........ *B29C 66/30223* (2013.01); *B29C 66/41* (2013.01); *B29C 66/45* (2013.01); *B29C 66/73921* (2013.01); *B29C 66/80* (2013.01); *B29C 66/8122* (2013.01); *B29C 66/8167* (2013.01); *B29C 66/822* (2013.01); *B29C 66/8224* (2013.01); *B29C 66/8246* (2013.01); *B29C 66/8322* (2013.01); *B29C 66/847* (2013.01); *B29C 66/9221* (2013.01); *B29C 66/9231* (2013.01); *B29C 66/92211* (2013.01); *B29C 66/92431* (2013.01); *B29C 66/92443* (2013.01); *B29C 66/92445* (2013.01); *B29C 66/92611* (2013.01); *B29C 66/92921* (2013.01); *B29C 66/932* (2013.01); *B29C 66/934* (2013.01); *B29C 66/93431* (2013.01); *B29C 66/93441* (2013.01); *B29C 66/9511* (2013.01); *B29C 66/9513* (2013.01); *B29C 66/9516* (2013.01); *B29C 66/9592* (2013.01); *B29C 66/961* (2013.01); *B29C 66/71* (2013.01)

(58) Field of Classification Search
CPC ............ B29C 66/9513; B29C 66/9515; B29C 66/9516; B29C 66/9517; B29C 66/93431; B29C 66/9231; B29C 66/8246; B29C 66/8122; B29C 66/73921; B29C 66/45; B29C 66/41; B29C 65/00
USPC ....... 156/64, 73.1, 73.4, 358, 360, 366, 367, 156/378, 580.1; 228/1.1, 110.1, 111
See application file for complete search history.

(56) References Cited

U.S. PATENT DOCUMENTS

| | | | |
|---|---|---|---|
| 4,496,095 A | 1/1985 | Renshaw et al. | 228/102 |
| 5,110,381 A | 5/1992 | Heckard et al. | 156/64 |
| 5,197,371 A * | 3/1993 | van der Heijden | B23Q 5/26 156/358 |
| 5,295,700 A | 3/1994 | Crews et al. | 279/5 |
| 5,397,408 A | 3/1995 | Guzik | |
| 5,491,372 A | 2/1996 | Erhart | 310/80 |
| 5,557,154 A | 9/1996 | Erhart | 310/80 |
| 5,706,627 A | 1/1998 | Kirka et al. | 53/52 |
| 5,707,414 A | 1/1998 | Leidy | 65/158 |
| 5,788,791 A | 8/1998 | Grewell | 156/73.1 |
| 5,798,599 A | 8/1998 | Harwood | 310/323 |
| 5,829,115 A | 11/1998 | Speller, Jr. et al. | 29/525.06 |
| 5,880,580 A | 3/1999 | Johansen | 323/282 |
| 5,985,064 A | 11/1999 | Sato | |
| 6,036,796 A | 3/2000 | Halbert et al. | |
| 6,118,095 A | 9/2000 | Nagano | 219/110 |
| 6,152,350 A * | 11/2000 | Hayashi | B23K 20/10 228/102 |
| 6,190,296 B1 | 2/2001 | Gnad et al. | |
| 6,289,736 B1 | 9/2001 | Statnikov | |
| 6,450,393 B1 | 9/2002 | Doumanidis et al. | 228/110.1 |
| 6,491,785 B1 | 12/2002 | Sato et al. | 156/379.6 |
| 6,787,729 B2 | 9/2004 | Dugas et al. | 219/86.32 |
| 6,828,522 B2 | 12/2004 | Hochhalter et al. | 219/86.32 |
| 6,891,183 B2 | 5/2005 | Kitamura et al. | 250/559.29 |
| 6,951,052 B2 | 10/2005 | Clew | 29/525.06 |
| 6,965,091 B2 | 11/2005 | Terada et al. | 219/121.6 |
| 6,984,921 B1 | 1/2006 | Kosterman | 310/323.19 |
| 7,002,095 B2 | 2/2006 | Kato et al. | 219/86.41 |
| 7,141,752 B2 | 11/2006 | Hochhalter et al. | 219/86.25 |
| 7,819,158 B2 | 10/2010 | Klinstein et al. | 156/358 |
| 9,144,937 B2 * | 9/2015 | Klinstein | B29C 66/9511 |
| 2002/0038792 A1 | 4/2002 | Terada et al. | 219/121.6 |
| 2003/0136523 A1* | 7/2003 | Takahashi | B23K 20/10 156/580.1 |
| 2004/0069750 A1 | 4/2004 | Kato et al. | 219/86.1 |
| 2004/0241267 A1 | 12/2004 | Schultz | 425/193 |
| 2005/0077855 A1 | 4/2005 | Hochhalter et al. | 318/567 |
| 2005/0194491 A1* | 9/2005 | Hatano | G11B 23/044 242/608.8 |
| 2005/0241143 A1* | 11/2005 | Mizuno | H01L 24/81 29/739 |
| 2005/0284559 A1* | 12/2005 | Ripplinger | B29C 65/0672 156/73.5 |
| 2007/0068991 A1 | 3/2007 | Handel et al. | |
| 2007/0257087 A1 | 11/2007 | Klinstein et al. | 228/101 |
| 2009/0188966 A1 | 7/2009 | Klinstein | |

FOREIGN PATENT DOCUMENTS

| | | | |
|---|---|---|---|
| DE | 4317621 | 6/1994 | ............ B23K 20/10 |
| DE | 4321874 | 1/1995 | ............ B23K 20/10 |
| DE | 19753740 C1 | 7/1999 | |
| DE | 69528314 T2 | 9/2002 | |
| DE | 10354526 | 6/2005 | ............ B23K 20/12 |
| DE | 102006054760 | 5/2008 | |
| EP | 0421019 | 4/1991 | ............ B29C 65/00 |
| EP | 0421018 | 3/1994 | |
| JP | H03-183527 | 1/1993 | |
| JP | H10128552 | 5/1998 | |
| JP | 2006-231698 | 9/2006 | ............ B29C 65/08 |

OTHER PUBLICATIONS

Titel: Zeitgeäße Kunststoff-Verbindungstechnik . . . : für Thermoplaste; konstruktive u. techn. Arbeitshilfen; substituierende u. alternaive Fügetechnik, Verlag: Limeshain: Groeble, infotip, Erscheinungsjahr 1986, 304 Seiten, ISBN 3-88736-005-2 (64 pages).

Michaeli W et al.: "Bessere Nahtqualitaet Beim Ultraschallschweissen. \Better Weld Quality In Ultrasonic Welding", Kunststoffe, Carl Hanser Verlag, Munchen, DE, vol. 83, No. 9, Sep. 1, 1993 (pp. 667-670).

Fachbuchreihe Schweiβtechnik Band 151, Title: Ultraschallfugen und—trennen, Prof. Dr.-Ing. habil. Johannes Wodara, Magdeburg, ISBN 3-87155-212-7, DVS-Verlag GmbH, Düsseldorf, 2004 (9 pages).

"Ultrasonic Metal Bonding System Bonding Process." ULTEX: Ultrasonic Laboratory. Sep. 7, 2005 (1 page).

European Search Report dated Aug. 5, 2010 which issued in European Application No. EP 09005008.9 (11 pages).

International Search Report dated Feb. 28, 2008 which issued in related International Patent Application No. PCT/US2007/011011 (5 pages).

Extended European Search Report for Application No. EP 15180842.5, dated Apr. 18, 2016 (11 pages).

\* cited by examiner

ULTRASONIC PRESS WITH AUTOMATIC SPEED CHANGES IN ADVANCING MOVEMENT OF WELDING STACK

CROSS-REFERENCE TO RELATED APPLICATIONS

This application is a continuation of U.S. patent application Ser. No. 14/471,895, filed Aug. 28, 2014, now issued as U.S. Pat. No. 9,144,937, which is a continuation-in-part of U.S. patent application Ser. No. 14/209,273, filed Mar. 13, 2014, now issued as Pat. No. 9,849,627, which is a continuation of U.S. patent application Ser. No. 13/245,021, filed Sep. 26, 2011, now issued as U.S. Pat. No. 8,720,516, which is a continuation of U.S. patent application Ser. No. 12/418,093, filed Apr. 3, 2009, now issued as U.S. Pat. No. 8,052,816, which claims the benefit of and priority from U.S. Provisional Patent Application No. 61/042,574, filed Apr. 4, 2008, and is a continuation-in-part of U.S. patent application Ser. No. 11/800,562, filed May 7, 2007, now issued as U.S. Pat. No. 7,819,158, which claims the benefit of and priority from U.S. Provisional Patent Application No. 60/798,641, filed May 8, 2006, each of which is incorporated herein in its entirety.

FIELD OF THE INVENTION

The present invention relates generally to presses for use in ultrasonic welding or other systems for vibratory joining of plastic parts.

SUMMARY OF THE INVENTION

In accordance with one embodiment of the present concepts, an ultrasonic welding system includes a movable ultrasonic welding stack to apply vibrational energy, in response to control inputs, to at least one workpiece. The system further includes a motion control system to control a motion of the ultrasonic welding stack, and one or more sensors to sense at least one control variable and to output at least one control signal corresponding to the at least one control variable. The system also includes a controller providing control inputs, based on the at least one control signal, to the motion control system and causing, following initiation of a welding operation, an automatic change of speed of motion of the ultrasonic welding stack. The automatic change of the speed of motion is a function of the at least one control variable until the at least one control variable reaches a predetermined value.

In another aspect of the present concepts, a method for a welding operation includes initiating a welding operation by moving, in response to control inputs, an ultrasonic welding stack to apply vibrational energy to a workpiece. The method further includes causing, via a motion control system, controlled movement of the ultrasonic welding stack, and measuring, via one or more sensors, at least one control variable and outputting a corresponding control signal. In response to control inputs received from a controller and based on the control signal, causing, following initiation of a welding operation, an automatic change of speed of motion of the ultrasonic welding stack. The automatic change of the speed of motion is a function of the at least one control variable until the at least one control variable reaches a predetermined value.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention will be better understood from the following description of preferred embodiments together with reference to the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
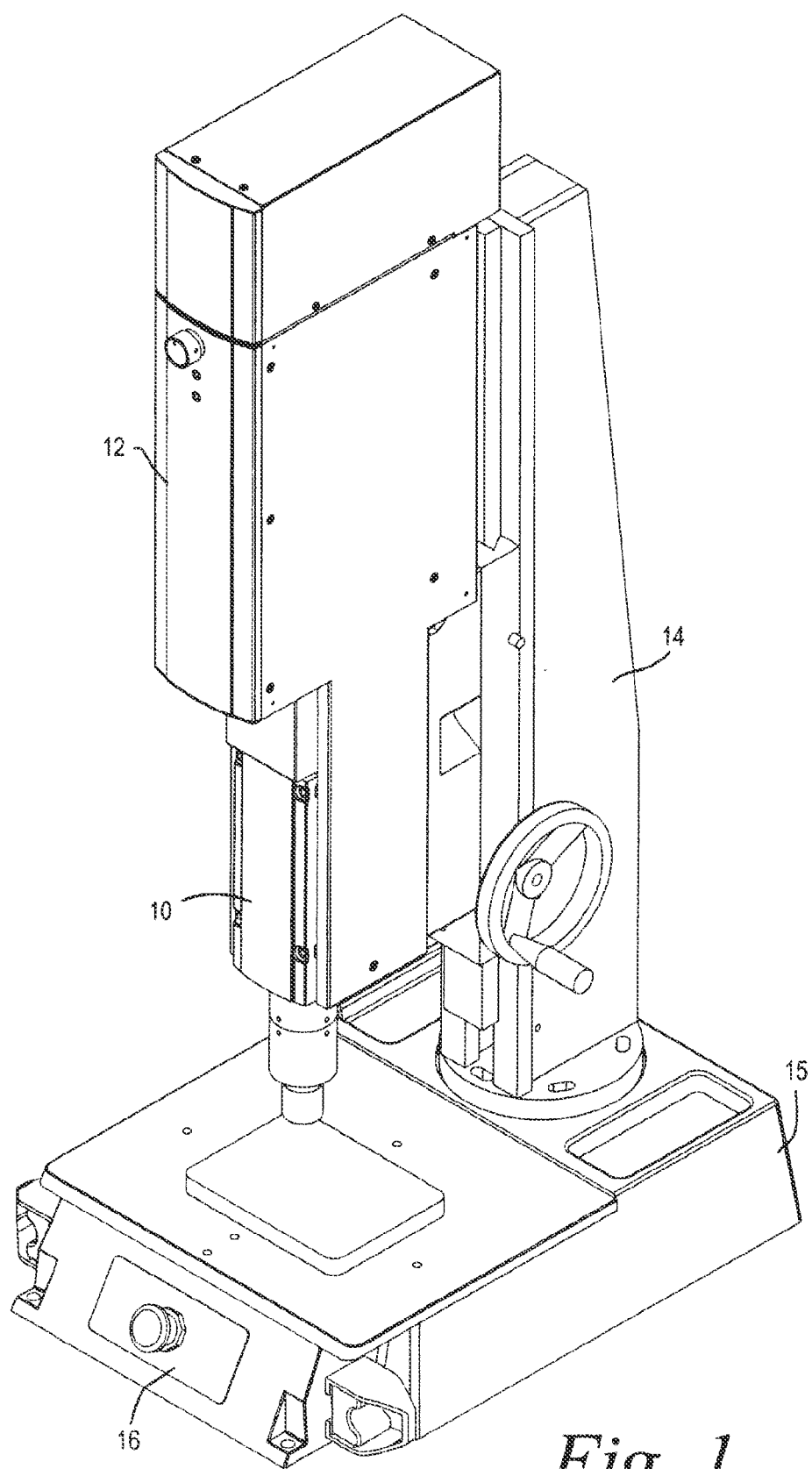
FIG. 1 is a front perspective view of an ultrasonic welding machine.
Figure 2:
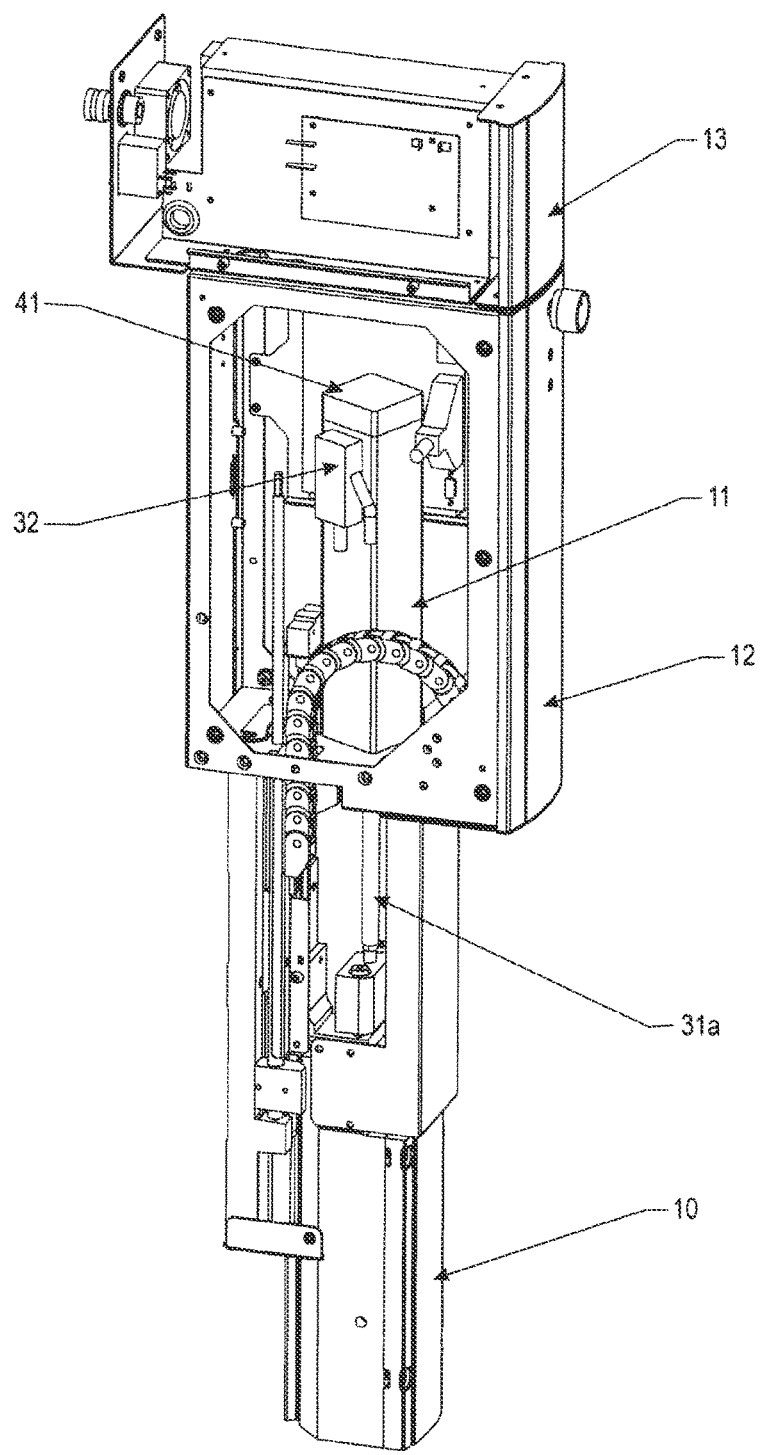
FIG. 2 is an enlarged side perspective of a portion of the ultrasonic welding machine shown in FIG. 1, with portions of the housing walls broken away to reveal the internal structure, including the linear actuator.

Turning now to the drawings and referring first to FIGS. 1-6, the illustrative ultrasonic welding machine includes an ultrasonic welding "stack" 10 that is mounted for controlled vertical movement by a bidirectional, electrically powered linear actuator 11 (FIG. 2). The stack 10 will be described in more detail below in connection with FIGS. 5 and 6. The actuator 11 is mounted within a main housing 12, which also supports an auxiliary housing 13 that contains the power supply and electronic controls for the welding press. In a variation of this concept, the housing 12 and auxiliary housing 13 may be combined into one structure without materially affecting the intent of this invention. The thermoplastic workpieces W1 and W2 (FIG. 5) to be welded are mounted in a stationary fixture below the ultrasonic stack 10, and the actuator 11 advances the stack 10 downwardly against the upper workpiece W1. The lower end of the stack 10 is pressed downwardly against the workpiece W1 to press the upper workpiece W1 against the lower workpiece W2 while applying mechanical vibrations to the workpiece W1 to effect the desired welding that joins the two workpieces W1 and W2 together.

The main housing 12 is mounted on a frame that includes a vertical column 14 extending upwardly from a base 15 that carries a fixture for receiving and supporting the workpieces to be welded. The housing 12 is typically adjustably mounted on the column 14 to allow the vertical position of the entire housing 12 to be adjusted for different workpieces. A control panel 16 is provided on the front of the base 15.

The ultrasonic welding stack 10 includes the following three components (see FIGS. 5 and 6):
- an electromechanical transducer 20 which converts electrical energy into mechanical vibrations;
- a booster 21 to alter the gain (i.e., the output amplitude) of the mechanical vibrations produced by the transducer 20; and
- a horn 22 to transfer the mechanical vibrations from the booster 21 to the parts to be welded.

Figure 5:
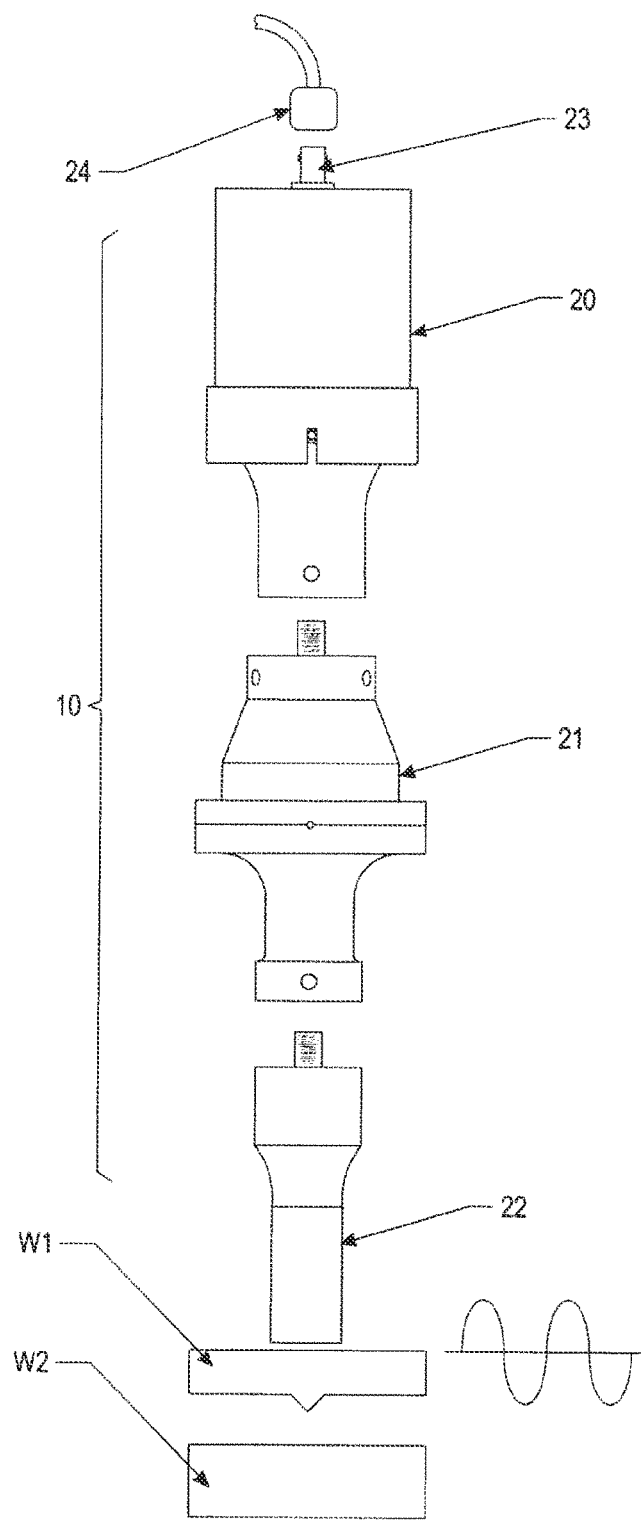
FIG. 5 is an enlarged, exploded elevation of the ultrasonic "stack" in the ultrasonic welding machine shown in FIG. 1.
Figure 6:
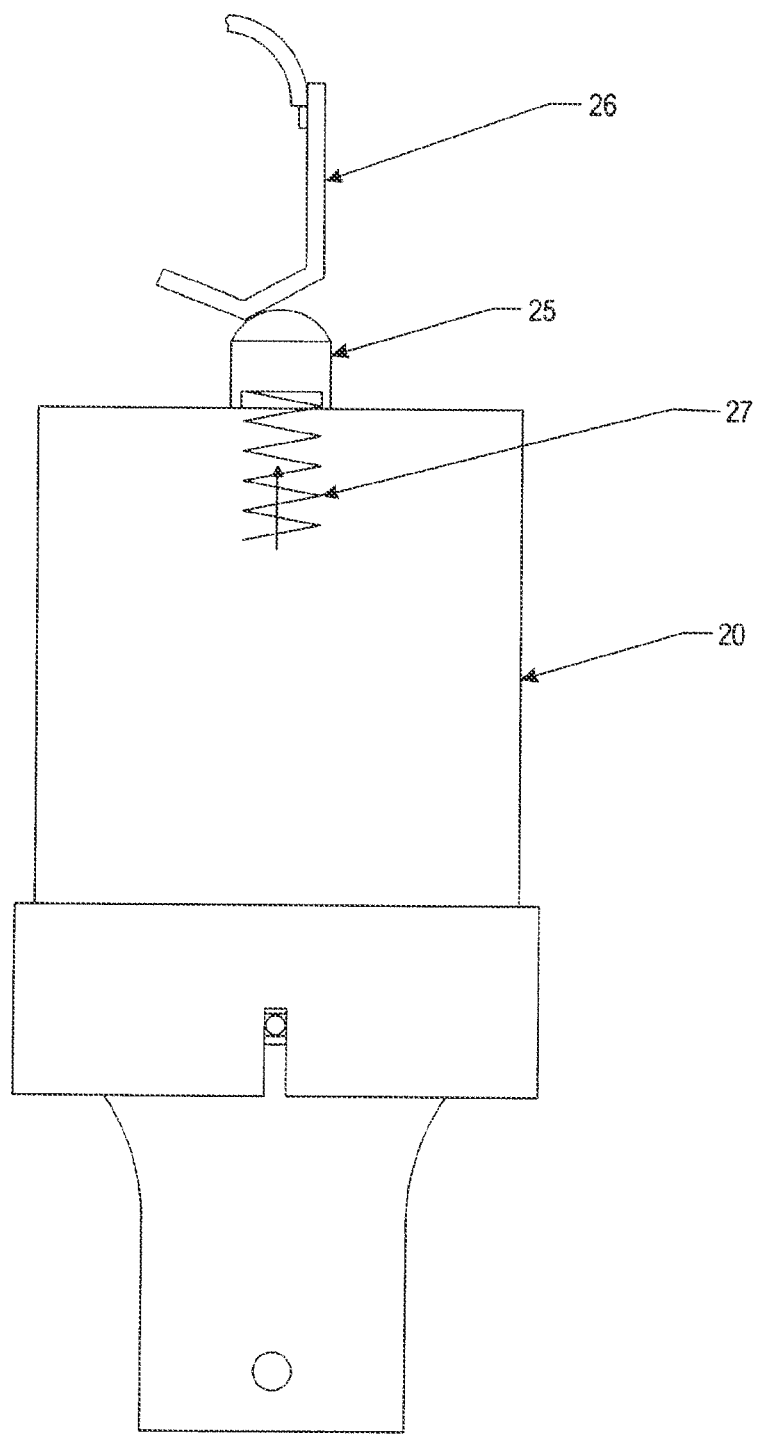
FIG. 6 is a variation of FIG. 5 showing a spring-loaded contact button which remains pressed against a contact bar.

As shown in FIG. 5, the transducer 20 includes a connector 23 for attaching a high voltage coaxial cable 24 that delivers a high-frequency electrical signal for exciting the transducer 20. This signal is supplied by a separate ultrasonic signal generator (not shown). An alternative method of connection can also be utilized to permit easier removal and installation of the transducer. This method as shown in FIG. 6 utilizes a spring mounted button on the transducer 20 which contacts a conductive bar on the press. Electrical conductivity is insured by the spring force behind the button as it presses against the bar.

The transducer 20 generates the ultrasonic vibrations as a Langevin piezoelectric converter that transforms electrical energy into mechanical movement. Power applied to the transducer 20 can range from less than 50 Watts up to 5000 Watts at a typical frequency of 20 kHz. Note that the same concepts will hold true for transducers of other frequencies and power levels which are regularly used in the welding processes of this invention.

The transducer 20 is typically made from a number of standard piezoelectric ceramic elements separated by thin metal plates, clamped together under high pressure. When an alternating voltage is applied to the ceramic elements, a corresponding electric field is produced which results in a variation in thickness of the ceramic elements. This variation in thickness induces a pressure wave that propagates through the material and is reflected by the ends of the metal mass of the transducer. When the length of the assembly is tuned to its frequency of excitation, the assembly resonates and becomes a source of standing waves. The output amplitude from a 20-kHz transducer is typically about 20 microns (0.0008 inches). This amplitude needs to be amplified by the booster 21 and the horn 22 to do useful work on the parts W1 and W2. The booster and horn act as an acoustic waveguide or transformer to amplify and focus the ultrasonic vibrations to the work piece.

The primary function of the booster 21 is to alter the gain (i.e., output amplitude) of the stack 10. A booster is amplifying if its gain is greater than one and reducing if its gain is less than one. Gains at 20-kHz typically range from less than one-half to about three.

The horn 22 cannot normally be clamped because it must be free to vibrate and thus only the transducer 20 and the booster 21 are secured. Thus, a secondary function (and sometimes the sole purpose) of the booster is to provide an additional mounting location without altering the amplification of the stack when secured in a press. The neutral or coupling booster is added between the transducer and horn and mounted in the press by a mounting ring which is placed at the nodal point (where the standing wave has minimal longitudinal amplitude).

The horn 22 has three primary functions, namely:
- it transfers the ultrasonic mechanical vibrational energy (originating at the transducer 20) to the thermoplastic work piece (W1 and W2) through direct physical contact, and localizes the energy in the area where the melt is to occur;
- it amplifies the vibrational amplitude to provide the desired tip amplitude for the thermoplastic workpiece and welding process requirements; and
- it applies the pressure necessary to force the weld when the joint surfaces are melted.

The horn is precision machined and is typically designed to vibrate at either 15 kHz, 20 kHz, 30 kHz, 40 kHz, 50 kHz or 70 kHz. The higher the frequency, the shorter the acoustic wavelength, and consequently the smaller the horn. The tuning of a horn is typically accomplished using electronic frequency measurement. Horns are usually manufactured from high-strength aluminum alloys or titanium, both of which have excellent acoustical properties to transmit the ultrasonic energy with little attenuation.

There are many different horn shapes and styles depending on the process requirements. Factors which influence the horn design are the materials to be welded and the method of assembly. The horn must amplify the mechanical vibration so that the amplitude is sufficient to melt the thermoplastic workpieces at their interface, and the gain of the horn is determined by its profile. The amplitude at the tip of the horn typically ranges from 30 to 125 microns peak to peak (1.2 to 5.0 thousandths of an inch) at 20 kHz. In an alternate variation, the horn can be designed so that it takes the form of a booster and combines the functions of stabilization and welding. In this variation, the booster is eliminated and the horn is secured in the press in the position of the booster mounting ring area.

As the frequency increases, the vibration amplitude decreases. Higher frequencies are used for seaming of thin materials and delicate parts that do not require a lot of amplitude. Since the horn becomes smaller at higher frequencies, closer spacing can also be achieved.

Plastic welding is the most common application of ultrasonic assembly. To perform ultrasonic plastic welding, the tip of the horn is brought into contact with the upper workpiece W1, as shown in FIG. 5. Pressure is applied and ultrasonic energy travels through the upper workpiece, increasing the kinetic energy (or heat) at the contact point of the two workpieces. The heat melts a molded ridge of plastic on one of the workpieces, and the molten material flows between the two surfaces. When the vibration stops, the material solidifies forming a permanent bond.

The linear actuator 11 comprises an electric servo motor 30 integrated with a converter 31 that converts the rotating output of the motor 30 into linear motion. The converter is typically a lead screw coupled to the motor output shaft 30*a*, with a follower unit traveling along the threads of the lead screw to produce the desired linear output. In the illustrative embodiment, the linear output is controlled vertical movement of a rod 31*a* that connects the converter 31 to the stack 10. The integrated unit that contains both the servo motor 30 and the converter 31 is a commercially available item, such as the GSM or GSX Series linear actuators available from Exlar Corporation of Chanhassen, Minn. See also U.S. Pat. No. 5,557,154 assigned to Exlar Corporation. The linear position feedback used by the servo motor can be provided by a linear encoder coupled to the weld stack 10, or by a rotary encoder which senses the position of the rotating motor 30.

Figure 4:
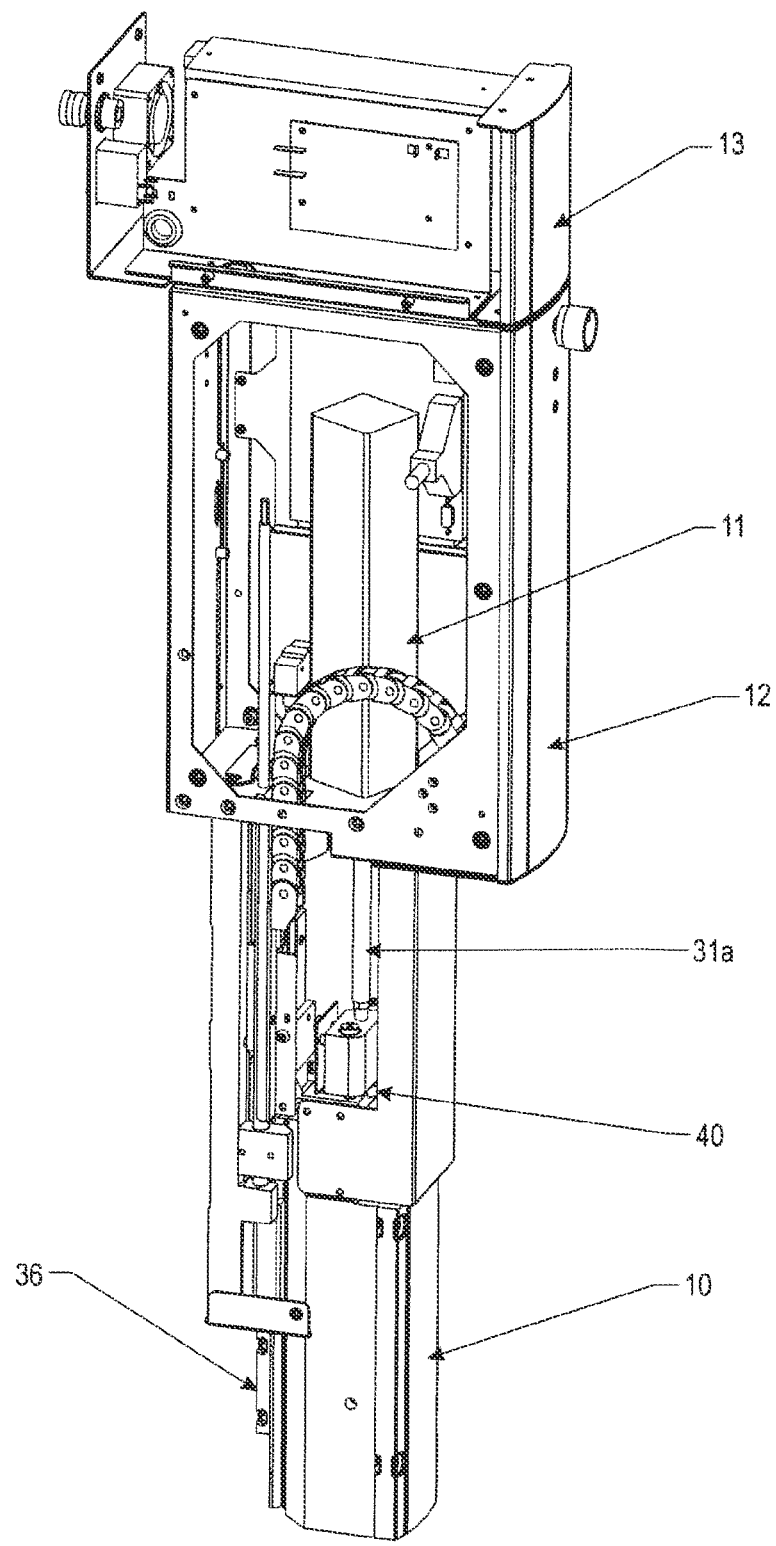
FIG. 4 is a variation of FIG. 2 showing a load cell used for force feedback.

As can be seen in FIGS. 2 and 4, the actuator rod 31*a* moves linearly along a vertical axis. The lower end of the rod 31*a* is connected to the components comprising the carriage to which the ultrasonic welding stack 10 is attached. The purpose of the actuator 11 is to apply a controlled force, speed, or a combination of force and speed to the stack 10 to press the stack downwardly against the workpiece W1 while the stack is also transmitting mechanical vibrations to the workpiece. The linear movement of the rod 31*a* is another controllable variable. For example, the linear movement of the rod 31*a* may be controlled so as to control a weld depth, especially after the thermoplastic material of the workpieces has been softened sufficiently to effect the desired weld. Excessive advancement of the rod 31*a* after the thermoplastic material has been softened by the applied vibrating energy can produce a weld that is too thin and, therefore, too weak. Likewise, in accord with concepts disclosed below, an initial linear movement of the rod 31*a* may be delayed, such as by being held at or near zero, until after a softening of the thermoplastic material of the workpieces causes a reduction in an initially applied force to a level below a predetermined threshold.

Figure 3:
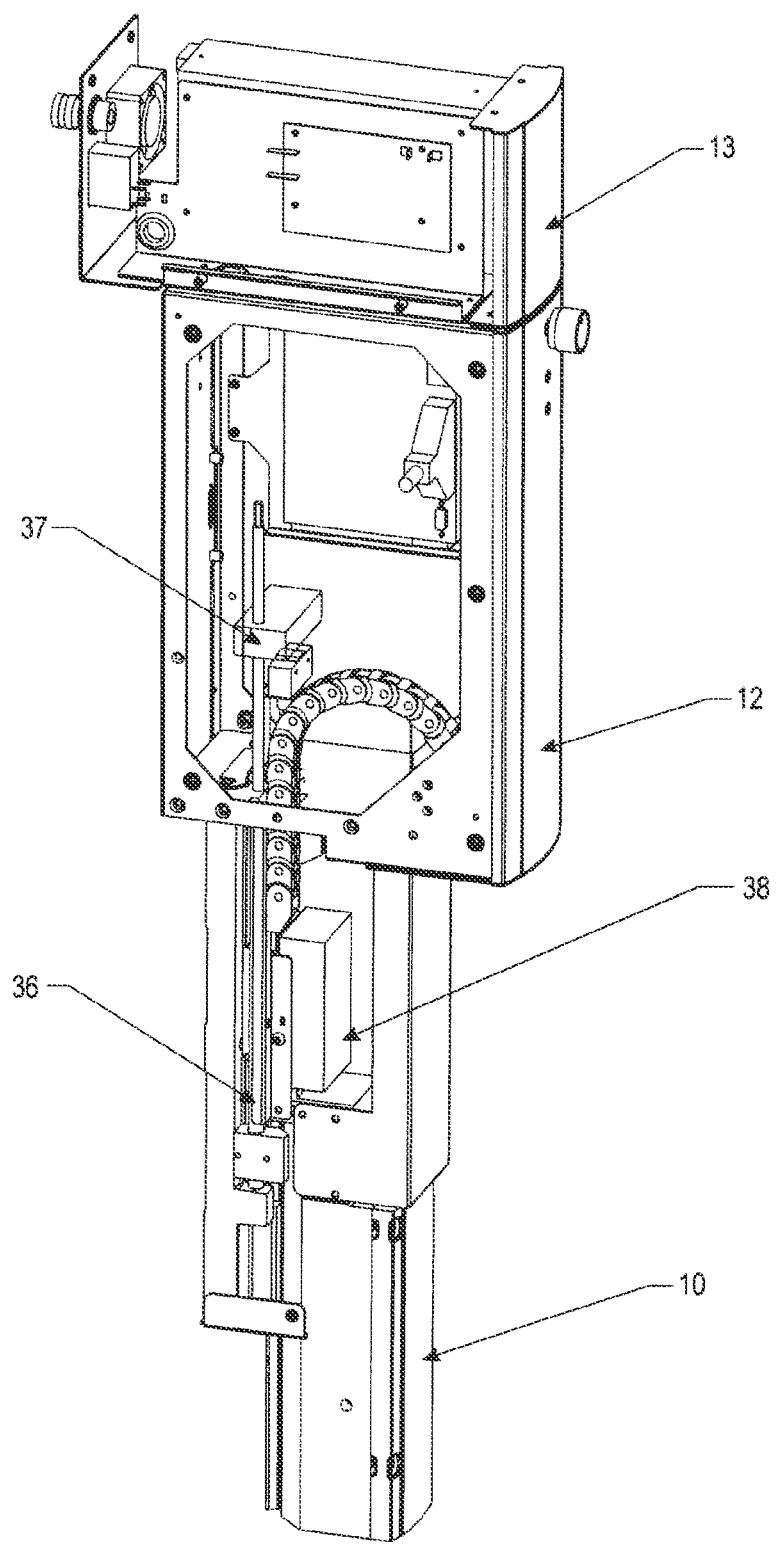
FIG. 3 is a variation of FIG. 2 showing a linear motor drive in place of the servo-motor driven actuator.

An alternative method of driving the welding stack is shown in FIG. 3 by the use of a direct drive linear servo slide. These slides reduce inaccuracies caused by gear backlash and power screw wrap up. A direct drive linear servo motor 38 acts on the stack assembly 10. This linear drive servo motor is a combination of the motor 30 and the converter 31. Such drives are commercially available from a number of suppliers such as the Parker Trilogy 410 Series. The position feedback 36 is provided directly by the linear motor, e.g., using an encoder or resolver coupled directly to the motor shaft. In order to use a linear servomotor in a vertical configuration, a separate, electric brake 37 is required to keep the welding stack 10 from falling under its own weight during power off conditions.

Figure 7:
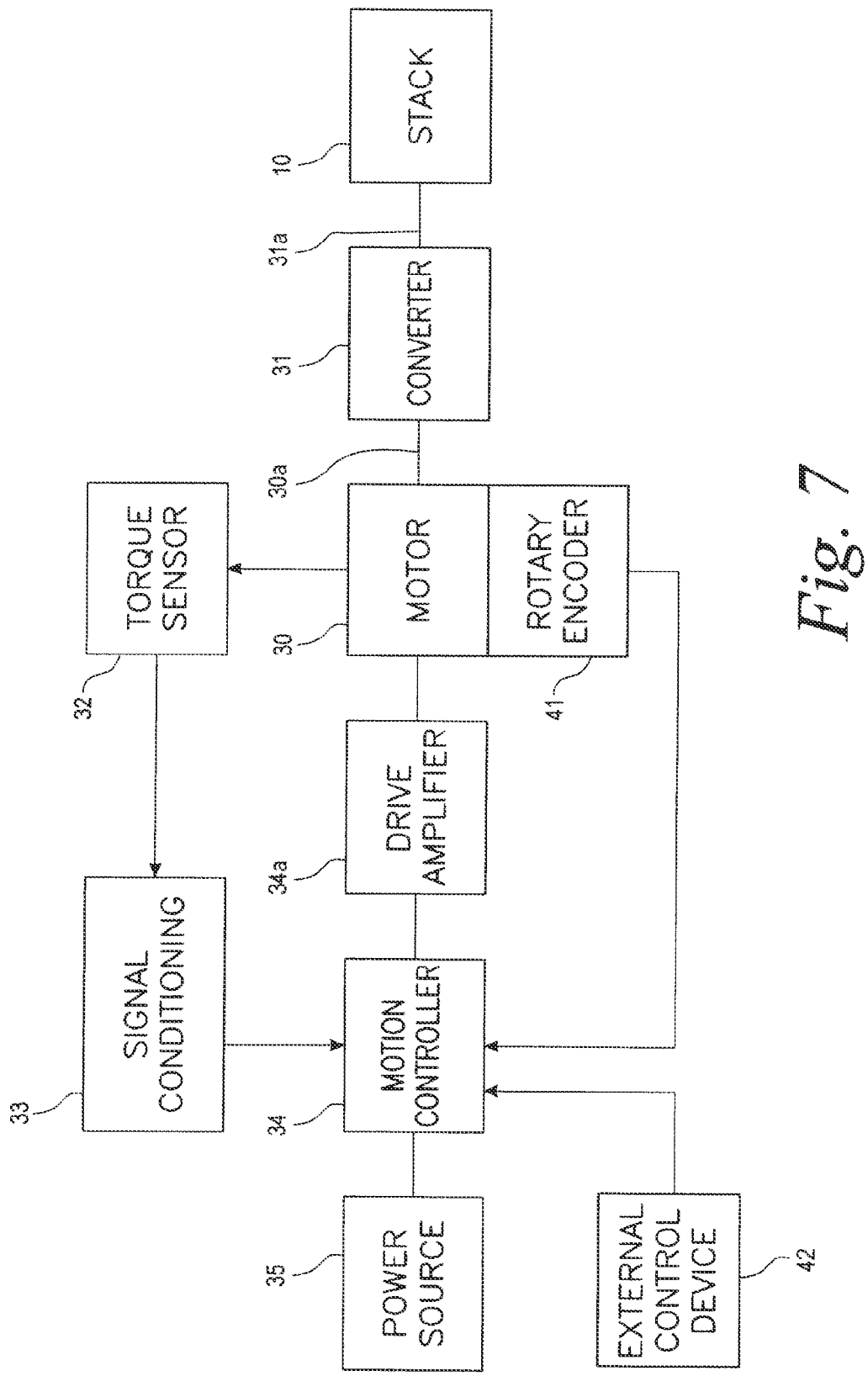
FIG. 7 is a block diagram of one embodiment of a control system for the linear actuator used in the ultrasonic welding machine shown in FIGS. 1-4.

FIG. 7 illustrates a control system for the linear actuator 11. A force control loop includes a torque sensor 32 coupled to the rotary output shaft 30*a* of the electrical servo motor 30, for producing an electrical signal related to the magnitude of the torque output of the motor 30. This torque signal is processed in conventional signal conditioning circuitry 33 and then supplied to a motion controller 34 that receives power from a power source 35 and controls the electrical current supplied to the motor 30 via drive amplifier 34*a*.

Thus, the torque sensor 32 and the signal conditioning circuitry 33 form a feedback loop that controls the motor 30 to turn the output shaft 30*a* with a desired torque, which in turn controls the force applied to the stack 10 by the converter 31 that converts the rotary output of the motor 30 to linear motion of the rod 31*a*. This feedback loop makes it possible to control the pressure applied to the workpieces during the welding operation by controlling the output torque produced by the servo motor.

Figure 8:
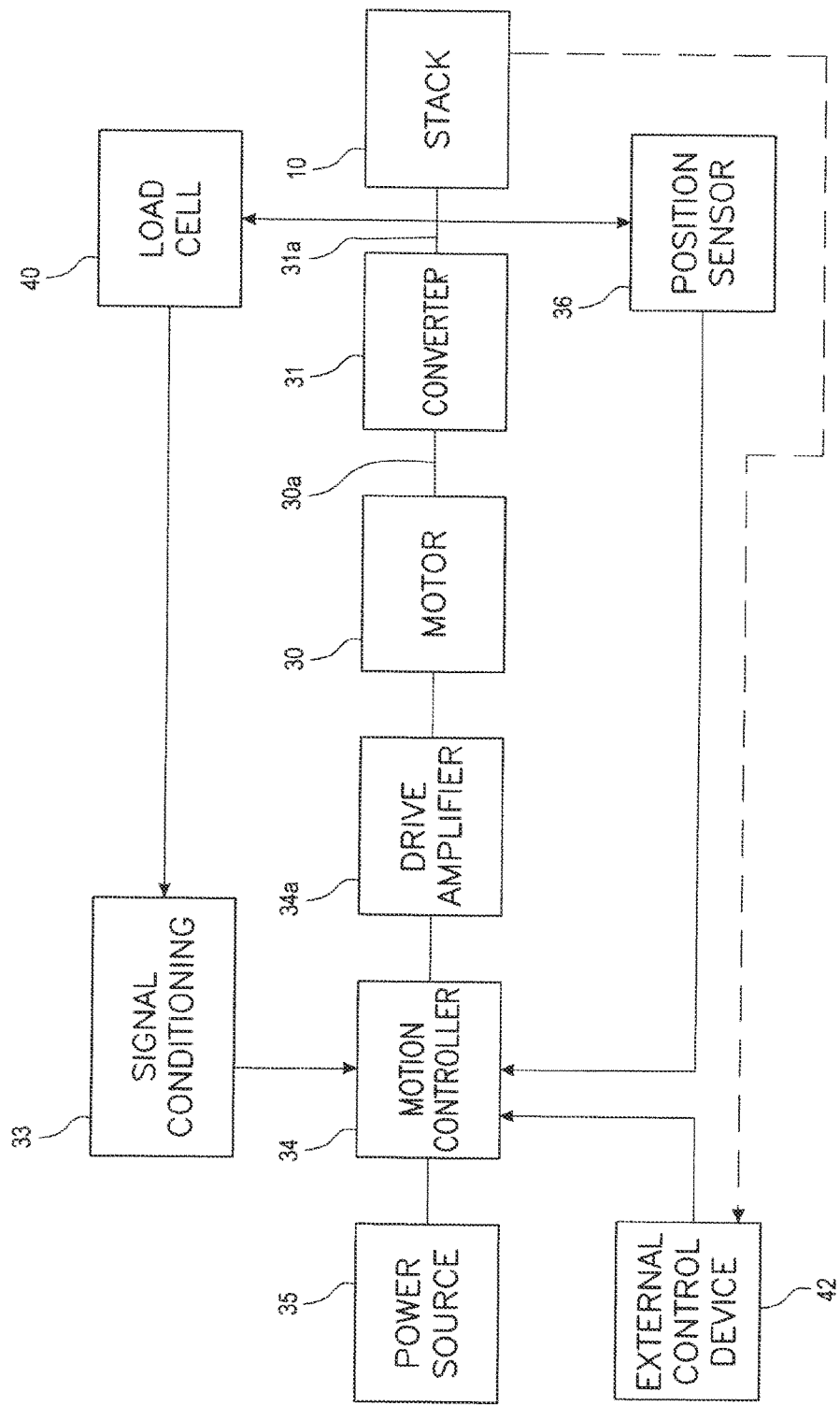
FIG. 8 is a block diagram of one embodiment of a control system for the linear actuator used in the ultrasonic welding machine shown in FIG. 4.

An alternate method of providing force feedback to the control system uses a commercially available load cell in place of torque control on the motor drive itself. The load cell 40 is positioned so that it can measure the force exerted by the welding stack upon the work piece. This is illustrated in FIGS. 4 and 8.

To control the magnitude of the linear displacement of the rod 31*a*, a position sensor 36 is coupled to the rod 31*a*, for producing an electrical signal related to the vertical movement of the rod 31*a*. For example, the position sensor 36 may be an encoder that produces a number of electrical pulses proportional to the magnitude of the displacement of the rod 31*a*. This position signal is supplied to the controller 34 as a further parameter for use by the controller 34 in controlling the electrical current supplied to the motor 30. Thus, the position sensor 36 is part of a feedback loop that controls the motor 30 to control the angular displacement of the output shaft 30*a*, which in turn controls the magnitude of the vertical movement of the rod 31*a*, and thus of the stack 10. The actual displacement of the stack 10 is, of course, a function of both the force applied by the motor 30 and the resistance offered by the workpieces, which varies as the weld zone is heated and softens the thermoplastic material of the workpieces.

An alternate method of determining the linear position of the welding stack during the welding cycle is by utilizing the encoder feedback of the motor. This is represented by item 41 in FIG. 7 or item 36 in FIG. 8. This position is a function of motor position and the drive screw nut lead in combination with any gear reduction used in the drivetrain.

In addition to controlling the force, speed, or combination of force and speed directly, the motion control system 34 is capable of automatically changing the force or speed on-the-fly based on an arbitrary algorithm using an input signal or combination of signals from an external control device 42. The external control device 42 may be the ultrasonic generator or controller which provides power and control to the stack 10. It may be a controller which is connected to or involved with the workpieces W1 and W2. In these instances the motion controller 34 receives the input signal(s) from an external device 42, signal conditioner 33, and position sensor 36 and generates the force or speed changes during the welding and holding processes. For example, the actuator can be commanded to automatically change force or speed in an effort to maintain ultrasound power output (provided by ultrasonic generator) constant. As a second example, the ultrasonic transducer 20 may provide feedback power to an external control device 42 related to the force being exerted upon it. This feedback power will be used as a basis for the external control device to influence the motion controller 34 to change the force or speed of the motor and actuator rod 30 and 31*a*. The result will be a closed servo-control loop relating the force applied to the workpiece W1 and W2 and the actual welding speed as reported by either or both of the position sensors 36 and 41.

There are numerous advantages of using servo-electric control in a welding system of this type. The primary advantage is the capability to precisely control the position of the welding stack throughout the weld process due to the repeatable and controllable nature of electrical power compared with pneumatic systems, which are subject to inaccuracies due to media compressibility. A second advantage is ability to change the speed or force of the weld stack faster from one level to another using a servo system. A third advantage is the increased ease of calibration and verification of a welding system using an electric servo due to absence of all pneumatic controls, which also reduces the effort involved in setting up multiple welding systems to achieve matching performance.

It is also possible to combine the effects of the speed and force feedback to control the weld process. An example of this is monitoring and varying the speed as a secondary control in order to hold a constant force exerted by the servo motor on the part. In this scenario a maximum and minimum welding speed can be defined to ensure that all parts have a well defined envelope of process parameters. The reciprocal method of varying the force exerted by the servo motor within defined limits to maintain a predetermined velocity profile is also viable with this apparatus and the control capabilities inherent in the design. As one example, the ultrasonic welding method includes at least one input signal to adjust the force or speed of the linear actuator responsive to a measured power (e.g., an instantaneous power) delivered to the transducer 20. In another example, the ultrasonic welding method includes at least one input signal to adjust the force or speed of the linear actuator responsive to a cumulative power delivered to the transducer 20 (i.e., the power delivered to the transducer is continually summed over time to yield the cumulative power, and this cumulative power may be used as the reference in a feedback loop).

Figure 9:
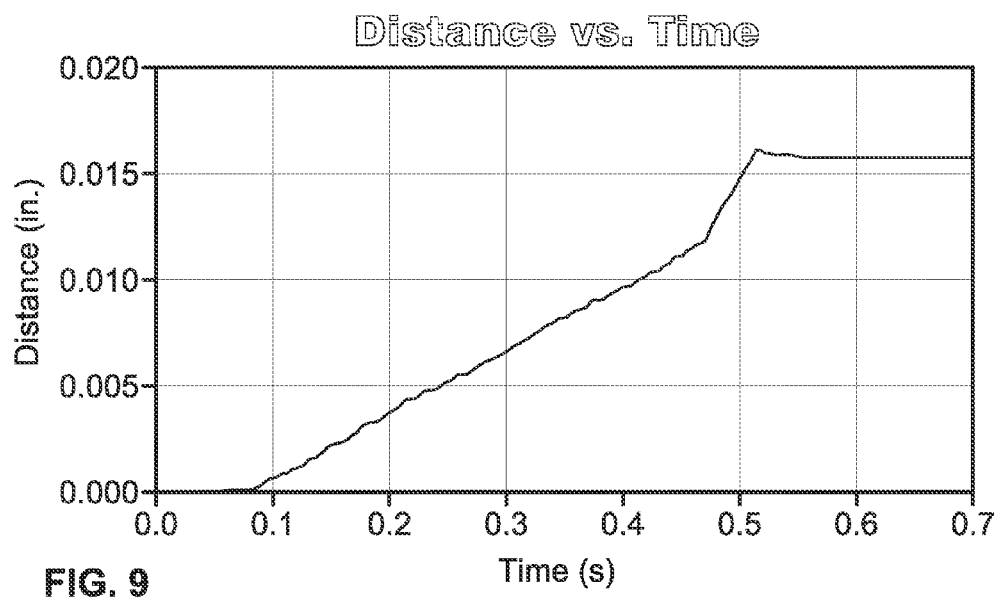
FIG. 9 shows a distance versus time graph for a weld sample formed using a servo press and employing a delayed motion technique in accord with at least one aspect of the present concepts.
Figure 10:
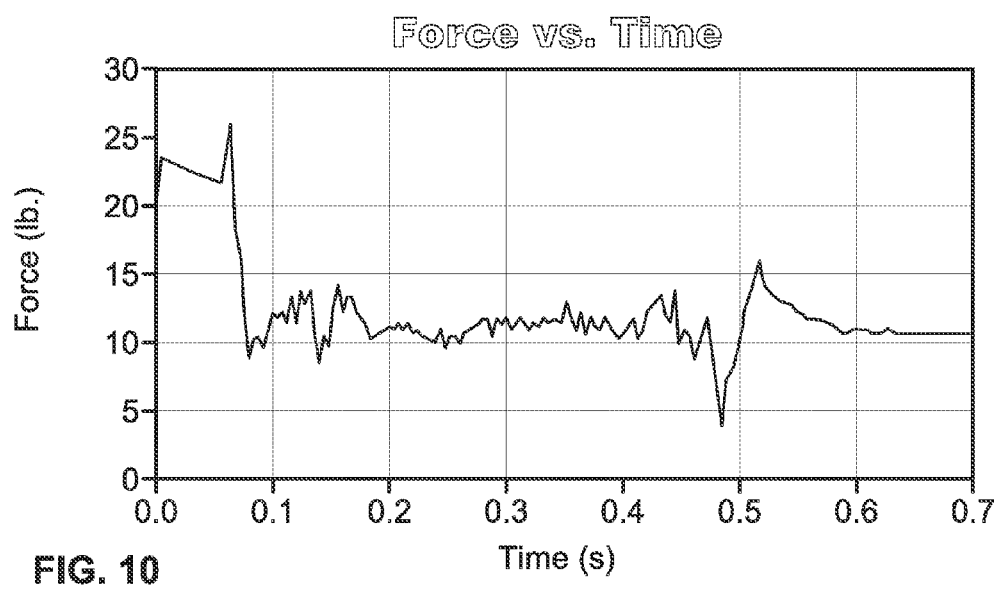
FIG. 10 shows a force versus time graph for the weld in the sample noted in FIG. 9.
Figure 11:
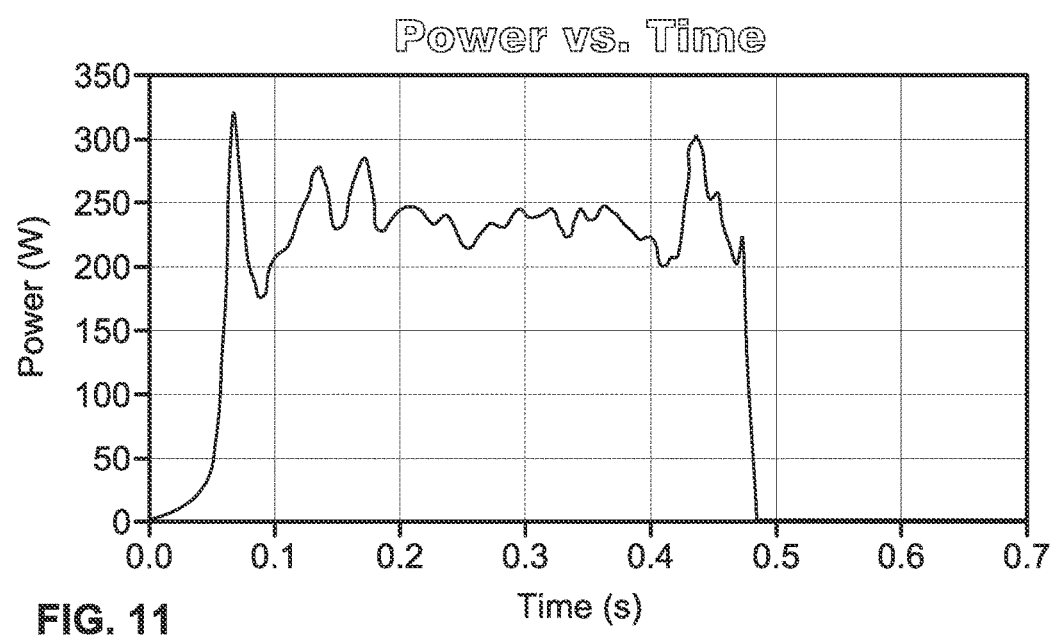
FIG. 11 shows a power versus time graph for the power output to the transducer of the weld stack for the weld in the sample noted in FIG. 9.

FIG. 9 shows a distance versus time graph for a polycarbonate weld sample formed using a servo press system and employing a delayed motion technique in accord with at least one aspect of the present concepts. FIG. 10 shows a force versus time graph for the weld in the sample noted in FIG. 9. FIG. 11 shows a power versus time graph for the power output to the transducer of the weld stack for the weld in the sample noted in FIG. 9. In this depicted experimental weld sample, a feature was implemented wherein, after an initial load ("trigger force") of 20 pounds was applied to the ultrasonic stack, the displacement of the ultrasonic weld stack 10 was held substantially at zero. It bears noting that the initial load is a variable load that is selectable by an operator or, alternatively by the control system upon input of appropriate welding parameters and process information, and may vary between zero pounds and any upper limit of the linear actuator utilized. After this initial load was applied, the welding operation was initiated at a time of 0 seconds by powering the transducer 20 of the ultrasonic welding stack 10. At that time, the weld collapse distance was 0 inches. Through the time of about 0.080 seconds, the weld distance was maintained substantially at 0 inches.

During this time, the ultrasonic weld stack 10 power increased and the welding operation began to soften the thermoplastic material of the workpiece at the welding point. Correspondingly, a drop in force (FIG. 10) starting at a time of about 0.064 seconds is observed. At this time, the power to the transducer 20 is about 275 W (see FIG. 11). Between about 0.064 seconds and about 0.080 seconds, the force applied by the linear actuator 11 on the ultrasonic weld stack 10 is observed to drop from about 26 pounds to about 9 pounds. Up until this time, the weld distance is maintained near zero and the linear actuator rod 31a and ultrasonic weld stack 10 are not appreciably advanced. However, following the observed decrease in force past a selected predetermined threshold force, which was about 17 pounds in the present example, the control system initiated downward motion of the weld stack (e.g., a positive downward velocity) to continue the weld process in accord with a selected weld process profile, as indicated by the parameters in FIGS. 9-11.

The weld sample produced by the weld process depicted in FIGS. 9-11 was measured, yielding a collapse height (e.g. difference between unwelded and welded parts) of 0.0174 inches, and subsequently pull tested, yielding an ultimate pull strength of 1006 pounds. In testing of the concepts described herein, a statistically significant number of samples were welded under similar conditions (i.e., implementing a delayed motion technique as described herein) and yielded an average collapse height of 0.0172 inches with a standard deviation of 0.0001 inches, and pull strength of 991 pounds with a standard deviation of 19 pounds. Comparison tests were performed on another group of the same weld samples using a pneumatic system with the same ultrasonic weld horn and generator. In the pneumatic tests, the ultrasonic weld stack was operated in a "force" mode wherein a specified weld force is maintained by controlling air pressure to achieve a fairly constant weld force throughout the weld. By comparison, a statistically significant number of samples produced by the pneumatic system weld process were measured, yielding an average collapse height of 0.0182 inches with a standard deviation of 0.0005 inches, and pull tested, yielding an average pull strength of 1002 pounds, with a standard deviation of about 31 pounds.

The results of the servo tests implementing the delayed motion technique were superior to those of the pneumatic tests for consistency of collapse distance and pull strength repeatability. In addition, although the absolute average value of the pull strength was slightly higher with the pneumatic system, the average weld collapse distance was also slightly higher. Since these samples employed a shear weld joint design familiar to those skilled in the art, the average pull strengths per unit of weld collapse distance can be compared. The samples welded on the servo system yielded a higher relative strength compared to the samples welded on the pneumatic system. The average values were 57,700 and 55,200 pounds per inch of weld collapse, respectively.

It is expected that still further improvements to weld strength may be obtained by adjusting the amount of the delay before initiating a downward motion of the ultrasonic welding stack 10 as well as by adjusting the velocity profile throughout the remainder of the weld. Improvements to strength repeatability can also be expected by enhancing the accuracy and repeatability of force sensing employed in this technique, which can be achieved by further reducing electrical and mechanical noise in the sensing circuitry.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. As one example, although the weld distance of the ultrasonic welding stack has been described herein in the delayed motion phase of the welding operation to be maintained at or near zero, a slight slope or an arbitrary profile may be advantageously used.

As another example, in accord with at least some aspects of the present concepts, it is possible that the described actuator and associated control system could be implemented in combination with the second workpiece W2 such that the actuator moves the second workpiece W2 toward the stationary workpiece W1 attached to or adjacent a stationary welding stack (i.e., stationary except for the vibratory movement of the horn 22). The control systems described herein then control a linear movement of the second workpiece W2 against the first workpiece W1 by applying a controlled force, speed, or a combination of force and speed to the second workpiece with the electrically powered linear actuator to urge the second workpiece against the first workpiece to which the second workpiece is to be joined. Likewise, another potential application of the present concepts may include an arrangement wherein the second workpiece W2 is mounted adjacent the horn of the ultrasonic welding stack and the described actuator and associated control system implemented as previously described to bias the first workpiece W1 against the stationary workpiece W2 attached to or adjacent the stationary welding stack (i.e., stationary except for the vibratory movement of the horn 22). The control systems described herein then control a linear movement of the first workpiece W1 against the second workpiece W2. It is further to be understood that although forces may be shown to be applied in a particular manner herein, such as pressing against a stationary target workpiece from above, other variants of force application are included within the present concepts, such as, but not limited to, pulling a movable workpiece (e.g., W1) toward a stationary workpiece (e.g., W2) in like manner.

Figure 12:
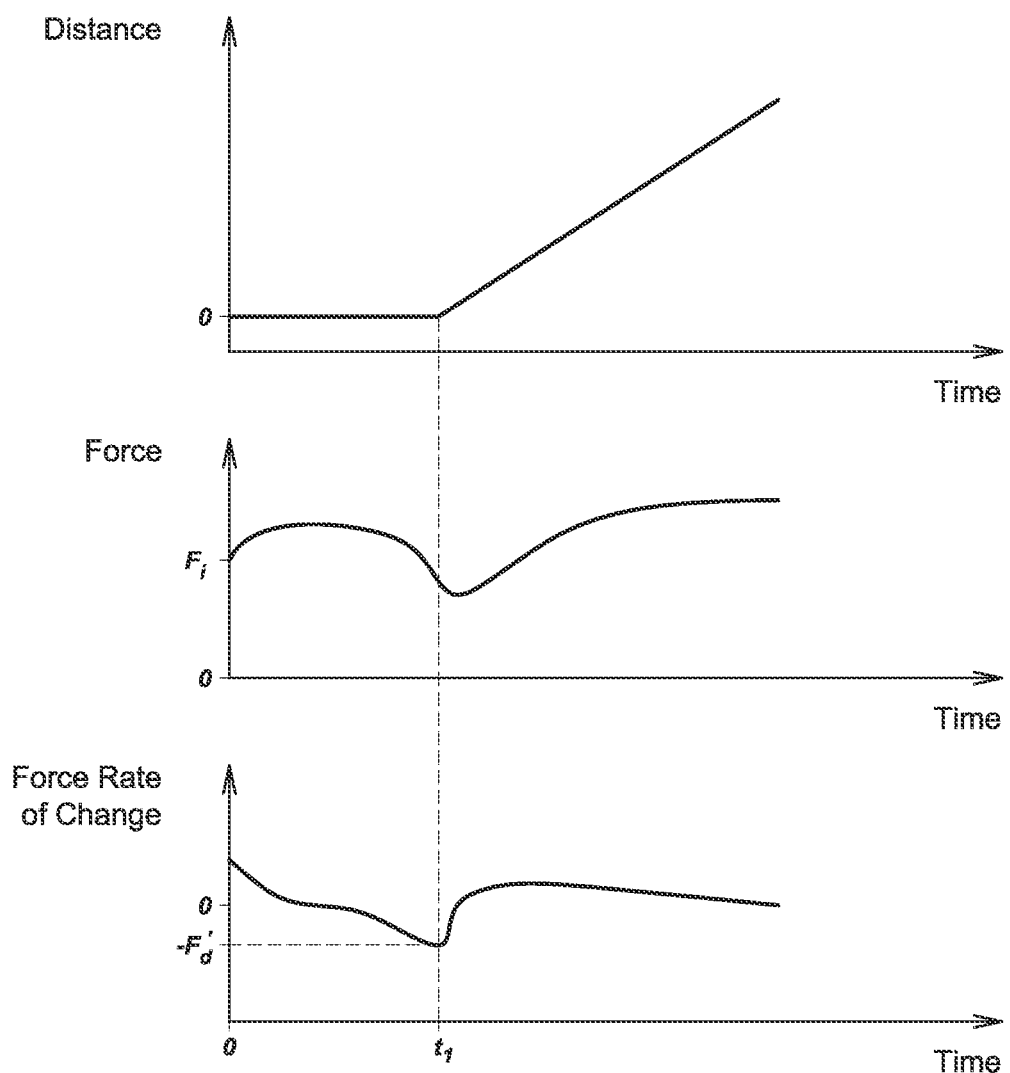
FIG. 12 shows an example of corresponding distance, force, and force rate of change graphs plotted versus time for a delayed weld motion.

Referring to FIG. 12, an example illustrates new conditions for initiating a weld motion based on parameter rates of change. As described in more detail above, a predetermined condition for initiating a weld motion includes crossing a prescribed threshold of a sensed parameter, such as a force parameter. Additionally, a weld motion is initiated when the predetermined condition is based on crossing a prescribed threshold of the rate of change of the sensed parameter.

For example, the weld motion is delayed until the time rate of change of force crosses a specified or predetermined level. In accordance with the specific example of FIG. 12, "0" (zero) on the time axis corresponds to the initiation of ultrasonic vibrations, and the condition for initiating the weld motion is the force rate of change falling to a prescribed level. The graph of distance plotted versus time indicates that a weld press remains stationary for an initial phase of the weld. During this initial phase, a press force initially rises from an initial force $F_i$, reaches an apex, and then falls as a plastic material of the parts being welded softens and begins to melt. A corresponding graph of the force rate of change, which is the slope of the force curve, shows that the force rate of change is initially positive, then decreases to "0" (zero), and subsequently becomes negative. When the force rate of change reaches a predetermined level $-F_d'$, the weld motion is initiated. In the example of FIG. 12, the weld motion is depicted by a linear increase in the distance beyond a time $t_1$.

According to other examples, rates of change of other parameters may be used as a basis for the predetermined condition. For example, the rates of change may include a power input rate of change for a transducer, a frequency rate of change for an ultrasonic stack, and/or a phase rate of change for a transducer.

According to an exemplary embodiment A1, a sensor senses the rate of change of a power input to a transducer of an ultrasonic welding stack and a predetermined condition is one or more of a specified rate of change of power or a specified rate of change of cumulative power.

According to another exemplary embodiment A2, a sensor senses a rate of change of a frequency of an ultrasonic welding stack and a predetermined condition is a specified rate of change of frequency.

According to yet another exemplary embodiment A3, a sensor senses a rate of change of a phase of a transducer of an ultrasonic welding stack and a predetermined condition is a specified rate of change of phase.

According to yet another exemplary embodiment A4, a sensor senses a rate of change of a force output by a linear actuator movable element and a predetermined condition is a specified rate of change of force.

According to yet another exemplary embodiment A5, a sensor senses a rate of change of an output torque of a servo motor and a predetermined condition is a specified rate of change of output torque.

Figure 13:
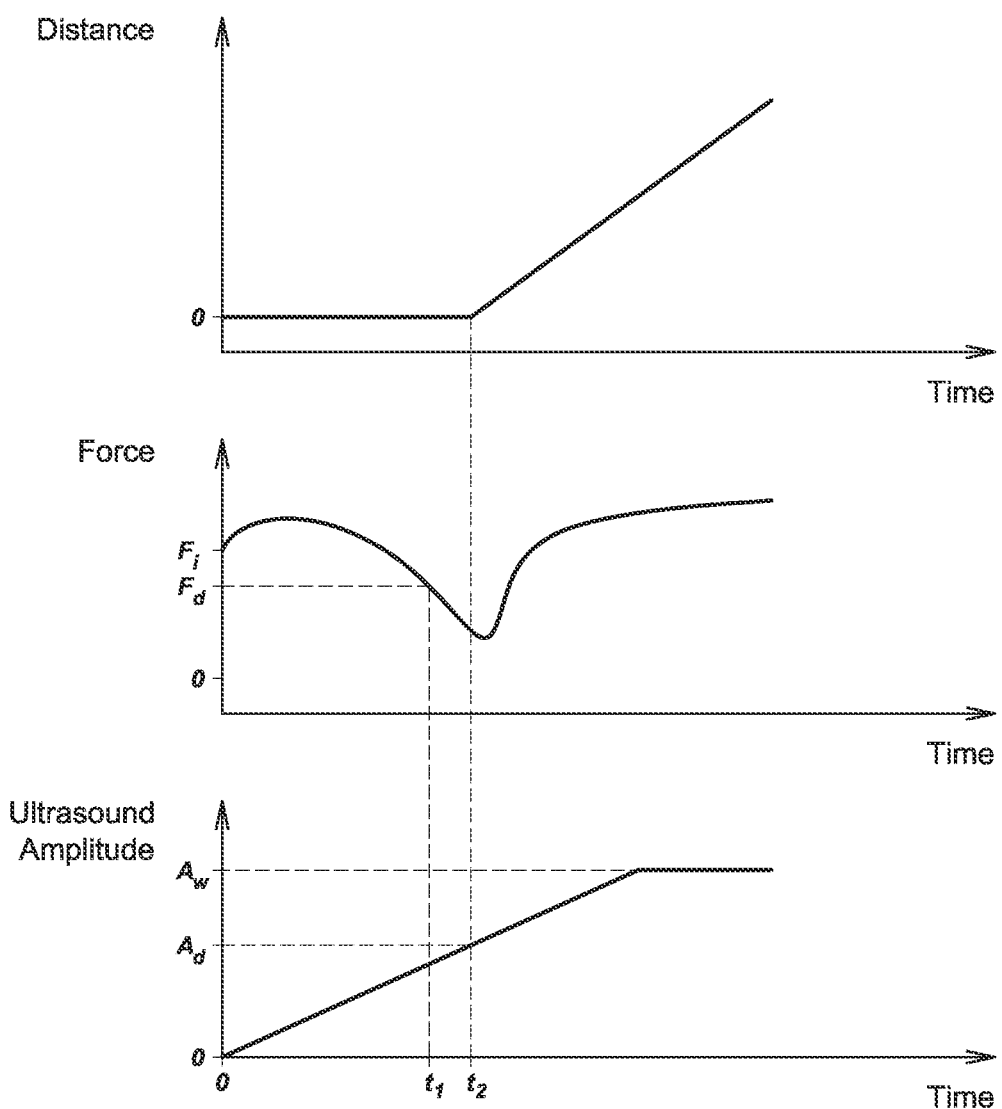
FIG. 13 shows another example of corresponding distance, force, and ultrasound amplitude graphs plotted versus time for a delayed weld motion.

Referring to FIG. 13, an illustrative enhancement of conditions for initiating a weld motion is described in more detail. The above-described criteria for initiating a weld motion are sufficient to positively affect the weld process in most cases. However, under certain conditions, including when a welding system has not been programmed in an optimal manner based on lack of operator experience, benefits of initiating the weld motion may not be fully realized. According to one specific example, if the predetermined condition for initiating the weld motion is a specified force X1 and the difference dX between the specified force X1 and a predetermined positive initial force X0 is programmed to be too small, the specified force X1 may be reached before sufficient time elapses for the amplitude of the ultrasonic stack to ramp up to a sufficiently high level to cause melting. For example, one reason for reaching the specified force X1 too soon is the fluctuation in force caused by subtle changes in alignment of the workpieces when ultrasonic vibrations are initiated.

To increase the likelihood of fully realizing the benefits of delaying the weld motion, criteria for delaying the weld motion can be enhanced by combining multiple conditions. For example, instead of relying on a single condition, the weld motion is initiated by utilizing multiple conditions based on input from multiple sensors. By way of example, the weld motion is delayed until both of the following conditions are satisfied: (a) the force decreases below a specified threshold, and (b) the ultrasound amplitude increases above a specified threshold. In this example, a premature initiation of the weld motion, which may occur with a strictly force-based criterion, is prevented by ensuring that an appreciable amount of energy is being transferred to the parts to commence melting.

Such an example is illustrated in FIG. 13, which shows graphs of weld distance plotted versus time, force plotted versus time, and ultrasound amplitude plotted versus time. "0" (zero) on the time axis corresponds to the initiation of the ultrasonic vibrations. The press is stationary during the initial phase of the weld, as indicated by the graph of distance versus time. During this phase, the press force rises from the initial force $F_i$, reaches an apex, then falls as the plastic material of the parts being welded softens and beings to melt. Concurrently, the ultrasound amplitude increases with time at a predetermined rate from "0" (zero) to a programmed weld amplitude $A_w$. Although the force decreases below a prescribed level $F_d$ at $t_1$, the weld motion is delayed until the amplitude increases above a prescribed level $A_d$, which occurs at time $t_2$. The programmed weld motion follows, which in this case is depicted by a linear increase in distance beyond time $t_2$. According to other examples, other combinations of conditions can be used to achieve similar benefits.

According to an exemplary embodiment B1, an ultrasonic welding system includes a movable ultrasonic welding stack to move and to apply vibrational energy to at least one workpiece responsive to control inputs. The system also includes a motion control system to control a motion of the ultrasonic welding stack. The system further includes a controller to provide control inputs to the motion control system associated with the ultrasonic welding stack to control movement of the ultrasonic welding stack and to control an output of the ultrasonic welding stack to the at least one workpiece. The system further includes at least two sensors to sense control variables and to output signals corresponding to the control variables to the controller. The controller causes the ultrasonic welding stack to apply a predetermined positive initial force to the at least one workpiece prior to initiation of welding and to initiate subsequent movement of the ultrasonic welding stack, following initiation of welding, only after the signal outputs from the at least two sensors indicate that a combination of control variables satisfies a predetermined condition.

According to another exemplary embodiment B2, the sensors of embodiment B1 sense a force output by the linear actuator movable element and amplitude of the ultrasonic stack. The predetermined condition includes both a specified force and a specified amplitude.

According to yet another exemplary embodiment B3, the sensors of embodiment B1 sense a force output by the linear actuator movable element and a power input to a transducer of the ultrasonic welding stack. The predetermined condition includes both a specified force and a specified power.

According to yet another exemplary embodiment B4, the sensors of embodiment B1 sense a force output by the linear actuator movable element and a power input to a transducer of the ultrasonic welding stack. The predetermined condition includes both a specified force and a specified cumulative power.

According to yet another exemplary embodiment B5, one sensor of embodiment B1 senses a force output by the linear actuator movable element and another sensor of embodiment B1 tracks elapsed time following the initiation of welding. The predetermined condition includes both a specified force and a specified elapsed time.

According to yet another exemplary embodiment B6, the sensors of embodiment B1 sense an output torque of the servo motor and an amplitude of the ultrasonic welding stack. The predetermined condition includes both a specified output torque and a specified amplitude.

According to yet another exemplary embodiment B7, the sensors of embodiment B1 sense an output torque of the servo motor and a power input to a transducer of the ultrasonic welding stack. The predetermined condition includes both a specified output torque and a specified power.

According to yet another exemplary embodiment B8, the sensors of embodiment B1 sense an output torque of the servo motor and a power input to a transducer of the ultrasonic welding stack. The predetermined condition includes both a specified output torque and a specified cumulative power.

According to yet another exemplary embodiment B9, one sensor of embodiment B1 senses an output torque of the servo motor and another sensor tracks elapsed time following the initiation of welding. The predetermined condition includes both a specified output torque and a specified elapsed time.

According to yet another exemplary embodiment B10, the sensors of embodiment B1 sense one or more of a force output by the linear actuator movable element, an output torque of the servo motor, an amplitude of the ultrasonic welding stack, a power input to a transducer of the ultrasonic welding stack, a cumulative power input to a transducer of the ultrasonic welding stack, a frequency of the ultrasonic welding stack, and a phase of a transducer of the ultrasonic welding stack, and/or one or more of the sensors track an elapsed time following the initiation of welding. The predetermined condition includes simultaneously satisfying two criteria, including a first criterion and a second criterion, each criterion being associated with distinct sensed control variables. The first criterion including one of a specified force, output torque, amplitude, power, cumulative power, frequency, phase, or elapsed time. The second criterion including one of a specified force, output torque, amplitude, power, cumulative power, frequency, phase, or elapsed time.

Figure 14:
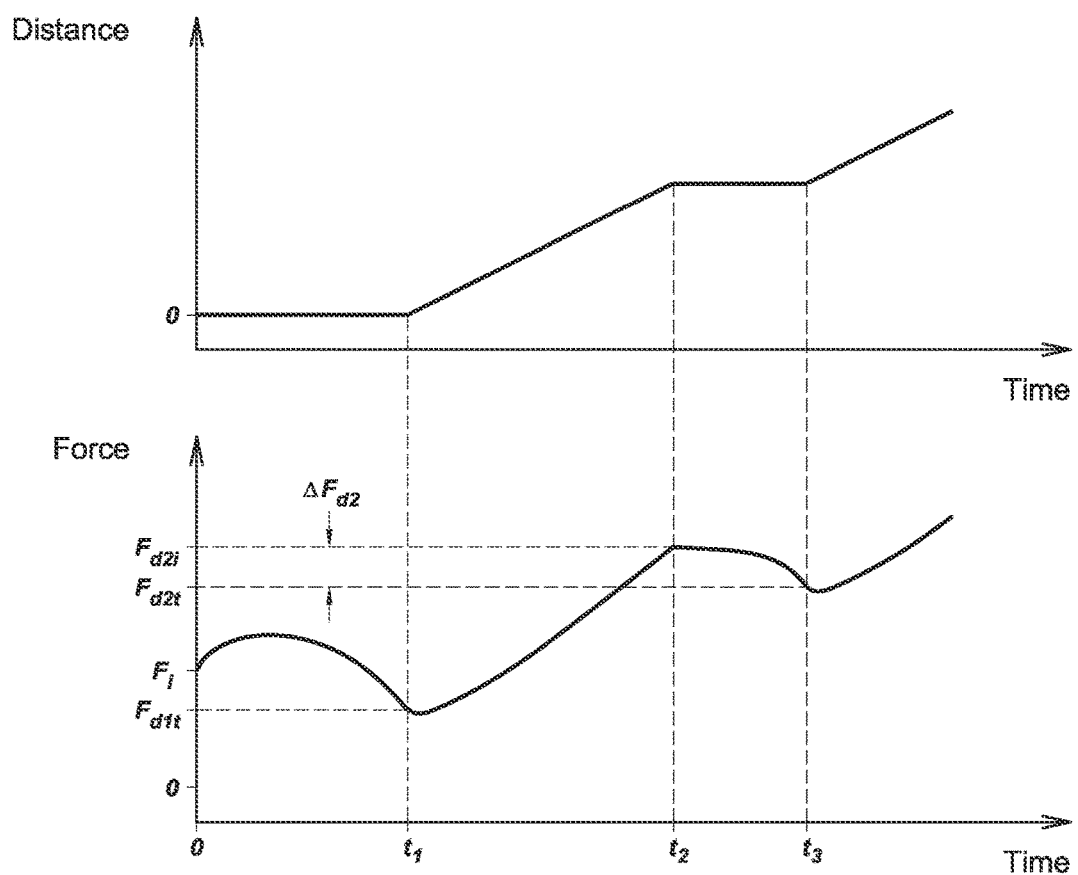
FIG. 14 shows another example of corresponding distance and force graphs plotted versus time for a weld motion with two motion delay phases.

Referring to FIG. 14, an alternative embodiment includes delaying the weld motion after some weld motion has already occurred. As described above, an ultrasonic welding system that employs a delayed motion applies to the initial stage of the weld phase, where the plastic parts being joined are starting to melt. However, for some applications this technique can also be beneficial when utilized during one or more latter phases of the weld. For example, on plastic parts where, by design, there is more volume of material to melt in one area relative to other areas, the rate of melt may not be uniform, resulting in unequally welded sections. In such cases, overall weld uniformity is improved by temporarily suspending the weld motion (e.g., maintaining the position of the weld stack) until the force decreases by a prescribed amount and additional melting occurs in the areas of concentrated material.

By way of a specific example, illustrated in FIG. 14, graphs of weld distance and force plotted versus time are shown for a weld with two motion delay phases. "0" (zero) on the time axis corresponds to the initiation of ultrasonic vibrations. The first delay that occurs in the time interval between time "0" and $t_1$ is generally similar to the weld delays described above. The second delay occurs after some weld motion has already taken place. In this embodiment, the second delay is initiated when the force reaches a prescribed level $F_{d2i}$, which is represented at time $t_2$, and the second delay is terminated when the force decreases by a prescribed amount $\Delta F_{d2}$, to $F_{d2f}$, which is represented at time $t_3$.

The second motion delay can be initiated by one or more of a number of parameters, including, for example, a force threshold, a power threshold, a cumulative power threshold, and/or a distance traversed from the start of the weld. The second motion delay can be terminated by one or more of a number of parameters, including, for example, a change in the force or power from the level sensed at the time of the initiating condition, and/or the amount of time that elapses from the moment of the initiating condition. The number of times that the weld motion may be delayed in a single weld cycle can vary from a single delay to numerous delays, as needed, based on specific weld requirements. Additionally, the delay at the initiation of ultrasonic vibrations may be omitted while one or multiple delays are subsequently employed after some weld motion has already occurred.

According to an exemplary embodiment C1, an ultrasonic welding system includes an ultrasonic welding stack mounted for linear movement and applying a controller force, speed, or a combination of force and speed to a first workpiece to urge the first workpiece against a second workpiece to which the first workpiece is to be joined. The system also includes an electrically powered linear actuator including a movable element coupled to the ultrasonic welding stack, the electrically powered linear actuator causing, responsive to control inputs, the movable element and the ultrasonic welding stack to move with a controlled force, speed, or force and speed. The system further includes a controller to provide control inputs to at least one of the electrically powered linear actuator or the servo motor to control an output of the electrically powered linear actuator. The system further includes one or more sensors to measure at least one corresponding control variable and to output a signal corresponding to the control variable to the controller. The controller, based on the signal output by at least one sensor, causes the electrically powered linear actuator movable element to stop motion and maintain a stationary position, subsequent to any preceding weld motion, from a predetermined delay initiating condition until a predetermined delay terminating condition. The controller, based on the signal output by at least one sensor indicating that the predetermined delay terminating condition has been satisfied, further causes the electrically powered linear actuator to resume motion of the ultrasonic welding stack in accordance with a default weld profile or a weld profile selected from a plurality of available weld profiles.

According to another exemplary embodiment C2, at least one sensor of embodiment C1 senses a force output by the linear actuator movable element. The predetermined delay initiating condition is a specified force and the predetermined delay terminating condition is a specified change in force from the level sensed at the time of initiating condition.

According to yet another exemplary embodiment C3, at least one sensor of embodiment C1 senses a distance traversed from the start of the weld and a force output by the linear actuator movable element. The predetermined delay initiating condition is a specified distance and the predetermined delay terminating condition is a specified change in force from the level sensed at the time of the initiating condition.

According to yet another exemplary embodiment C4, at least one sensor of embodiment C1 senses a power input to a transducer of the ultrasonic welding stack and a force output by the linear movable element. The predetermined delay initiating condition is a specified power and the predetermined delay terminating condition is a specified change in force from the level sensed at the time of the initiating condition.

According to yet another exemplary embodiment C5, at least one sensor of embodiment C1 senses a power input to a transducer of the ultrasonic welding stack. The predetermined delay initiating condition is a specified power and the predetermined delay terminating condition is a specified change in power from the level sensed at the time of the initiating condition.

According to yet another exemplary embodiment C6, at least one sensor of embodiment C1 senses a power input to a transducer of the ultrasonic welding stack and a force output by the linear movable element. The predetermined delay initiating condition is a specified cumulative power and the predetermined delay terminating condition is a specified change in force from the level sensed at the time of the initiating condition.

According to yet another exemplary embodiment C7, one sensor of embodiment C1 senses a force output by the linear actuator movable element and another sensor tracks elapsed time from the moment of the delay initiating condition. The predetermined delay initiating condition is a specified force and the predetermined delay terminating condition is a specified elapsed time.

According to yet another exemplary embodiment C8, one sensor of embodiment C1 senses a distance traversed from the start of the weld and another sensor of embodiment C1 tracks elapsed time from the moment of the delay initiating condition. The predetermined delay initiating condition is a specified distance and the predetermined delay terminating condition is a specified elapsed time.

According to yet another exemplary embodiment C9, one sensor of embodiment C1 senses a power input to a transducer of the ultrasonic welding stack and another sensor of embodiment C1 tracks elapsed time from the moment of the delay initiating condition. The predetermined delay initiating condition is a specified power and the predetermined delay terminating condition is a specified elapsed time.

According to yet another exemplary embodiment C10, one sensor of embodiment C1 senses a power input to a transducer of the ultrasonic welding stack and another sensor of embodiment C1 tracks elapsed time from the moment of the delay initiating condition. The predetermined delay initiating condition is a specified cumulative power and the predetermined delay terminating condition is a specified elapsed time.

According to yet another exemplary embodiment C11, one or more sensors of embodiment C1 sense one or more of a force output by the linear actuator movable element, an output torque of the servo motor, a position of the ultrasonic stack, a distance traversed from the start of the weld, a power input to a transducer of the ultrasonic welding stack, a cumulative power input to a transducer of the ultrasonic stack, a frequency of the ultrasonic stack, and a phase of a transducer of the ultrasonic stack, and/or one or more sensors of embodiment C1 tracks elapsed time following the initiation of welding. The predetermined delay initiating condition includes one or more of a specified force, an output torque, a position, a distance, a power, a cumulative power, a frequency, a phase, and/or an elapsed time. The predetermined delay terminating condition includes one or more of a specified absolute or relative value of a force, an output torque, a power, a cumulative power, a frequency, a phase, and/or an elapsed time. The reference for a relative value is the level of the particular parameter sensed at the time of the initiating condition.

According to yet another exemplary embodiment C12, one or more sensors of embodiment C1 sense the present values and the rates of change of one or more of a force output by the linear actuator movable element, an output torque of the servo motor, a position of the ultrasonic stack, a distance traversed form the start of the weld, a power input to a transducer of the ultrasonic welding stack, a cumulative power input to a transducer of the ultrasonic stack, a frequency of the ultrasonic stack, a phase of a transducer of the ultrasonic stack, and/or one or more sensors of embodiment C1 track elapsed time following the initiation of welding. The predetermined delay initiating condition includes one or more of a specified force, an output torque, a position, a distance, a power, a cumulative power, a frequency, a phase, and/or an elapsed time. The predetermined delay terminating condition includes one or more of a specified rate of change of a force, an output torque, a power, a cumulative power, a frequency, and/or a phase.

Figure 15:
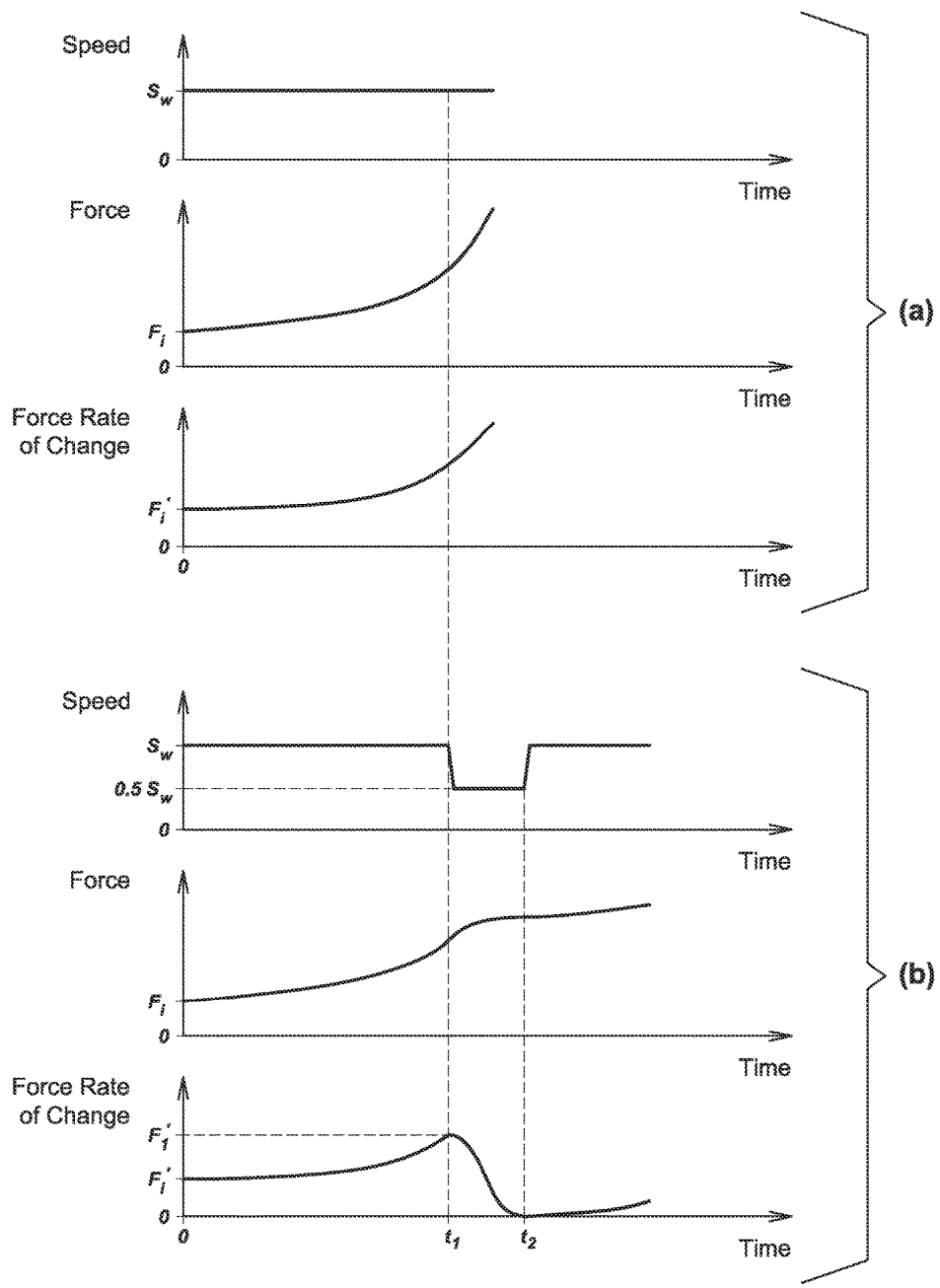
FIG. 15 shows another example of corresponding speed, force, and force rate of change graphs plotted versus time for a weld (a) without and (b) with dynamic speed adjustment.

Referring to FIG. 15, an alternative embodiment includes dynamic speed adjustment to reduce rapid changes in force. When controlling the speed of motion of an ultrasonic stack during the weld and hold (solidification) phases of a joining cycle, the resulting force between the work pieces varies according with the changing conditions of the parts being welded. In some cases, the rate of change in the force, positive or negative, is high and can have detrimental effects on the quality of the weld. To reduce this rate of change, the speed of the press can be dynamically adjusted by the welding system.

If the force is detected to be increasing at an excessively high rate, the press automatically reduces speed. Conversely, if the force is decreasing at an excessively high rate, the press automatically increases speed. The condition for initiating an automatic speed change is a specified rate of change in the force. The amount of speed change can be a predetermined fraction or multiple-factor of the current speed. For example, the speed change can include a reduction in speed of 100% relative to the current speed, or can include an increase in speed in excess of 100% of the current speed.

Alternatively, the amount of speed change can be assigned dynamically in proportion to a detected rate of change of force. In other words, a larger speed change would be commanded for a higher rate of change in the force. Several conditions can be used for terminating the speed change, including, for example, crossing a prescribed level in the rate of change of force and/or a return of the rate of change of force to the level at which the speed change was initiated.

According to the example illustrated in FIG. 15, graphs of weld speed, force, and force rate of change plotted versus time illustrate a weld (a) without and (b) with dynamic speed adjustment. Referring to the weld without the dynamic speed adjustment, the speed during the weld is constant at $S_w$, which results in a continuous increase in the force rate of change as determined by the slope of the force curve. When the dynamic speed adjustment is employed, the speed is automatically reduced to a prescribed level 0.5 $S_w$ (i.e., half of $S_w$) when the force rate of change increases to a prescribed level F1', which is represented at time $t_1$. This reduction subsequently causes a decrease in the force rate of change until it reaches a prescribed value of "0" (zero), which is represented at time $t_2$. The speed is, then, automatically reverted to the programmed weld speed $S_w$.

According to an exemplary embodiment D1, an ultrasonic welding system includes a movable ultrasonic welding stack to move and to apply vibration energy to at least one workpiece responsive to control inputs. The system also includes a motion control system to control a motion of the ultrasonic welding stack. The system further includes a controller to provide control inputs to the motion control system associated with the ultrasonic welding stack to control movement of the ultrasonic welding stack and to control an output of the ultrasonic welding stack to the at least one workpiece. The system further includes a sensor to sense the force on the parts being joined and to output the force to the controller. The controller causes the ultrasonic welding stack, following the initiation of the welding, to automatically change the speed of motion of the ultrasonic welding stack from a speed change initiating condition, based on a predetermined value of the rate of change of force, until a speed change terminating condition, based on a different value of the rate of change of force.

According to another exemplary embodiment D2, the initiating condition of embodiment D1 is an increase in the rate of change of force above a predetermined level. The speed is reduced to a fraction of the programmed speed or to zero.

According to yet another exemplary embodiment D3, the initiating condition of embodiment D1 is a decrease in the rate of change of force below a predetermined level. The speed is increased by a factor larger than 1 relative to the programmed speed.

According to yet another exemplary embodiment D4, the terminating condition of embodiment D1 is a decrease of the rate of change of force below a predetermined level.

According to yet another exemplary embodiment D5, the terminating condition of embodiment D1 is an increase in the rate of change of force above a predetermined level.

According to yet another exemplary embodiment D6, the terminating condition of embodiment D1 is a return of the rate of change of force to the level of the initiating condition.

Figure 16:
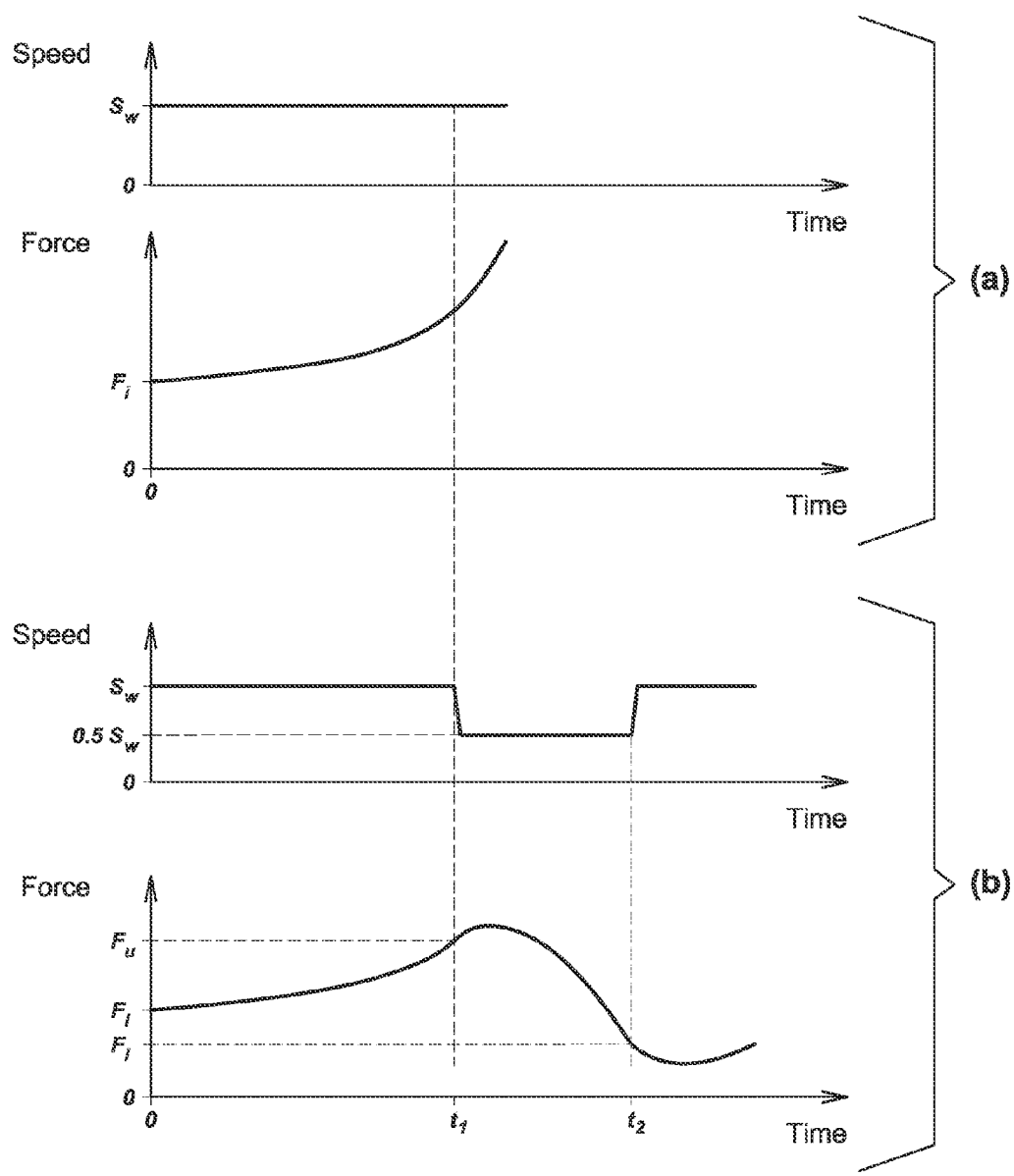
FIG. 16 shows another example of corresponding speed and force graphs plotted versus time for a weld (a) without and (b) with dynamic speed adjustment.

Referring to FIG. 16, another alternative embodiment includes dynamic speed adjustment to limit forces during a weld cycle. During the weld and hold (solidification) phases, it is beneficial in some cases to prevent the force between the parts being joined from becoming excessively large or excessively small. When directly controlling the speed of motion of the ultrasonic stack, the force can be influenced by automatically changing the speed based on an algorithm and input from a force sensor. If the force increases to a predetermined upper level, the press speed is reduced. Conversely, if the force decreases to a predetermined lower level, the press speed is increased.

The amount of speed change can be a predetermined fraction or multiple-factor of the current speed. By way of example, the amount of speed change can include a reduction in speed of 100% relative to the current speed or an increase in speed in excess of 100% of the current speed.

According to the example illustrated in FIG. 16, graphs of weld speed and force are plotted versus time and illustrate a weld without (a) and (b) with dynamic speed adjustment. Referring to the weld without the dynamic speed adjustment, the speed during the weld is constant at $S_w$, which results in a continuous increase in the force. When dynamic speed adjustment is employed, the speed is automatically reduced to a prescribed level 0.5 $S_w$ when the force reaches the predetermined upper value $F_u$, which is represented at time $t_1$. Subsequently, as the weld continues at the reduced speed, the force decreases and eventually reaches the predetermined lower value $F_1$, which is represented at time $t_2$. At this point in time, the speed automatically reverts to the programmed weld speed $S_w$.

Referring to the weld with the dynamic speed adjustment, the approach of changing the speed once the force reaches predetermined levels may result in an overshoot in the force above and/or below the predetermined levels because speed changes are not instantaneous. If tighter control or avoidance of the overshoot is desired, the automatic speed adjustment algorithm (utilizing other input parameters in addition to force) can be configured to forecast the timing and magnitude of the speed changes needed to avoid overshoot and, thus, maintain the force within the predetermined limits. Exemplary additional input parameters include, but are not limited to, the rate of change of force and/or the rate of change of ultrasound power.

According to an exemplary embodiment E1, an ultrasonic welding system includes a movable ultrasonic welding stack to move and to apply vibration energy to at least one workpiece responsive to control inputs. The system also includes a motion control system to control a motion of the ultrasonic welding stack. The system further includes a controller to provide control inputs to the motion control system associated with the ultrasonic welding stack to control movement of the ultrasonic welding stack and to control an output of the ultrasonic welding stack to the at least one workpiece. The system further includes one or more sensors to sense at least one control variable and to output at least one signal corresponding to the at least one control variable to the controller. The controller causes the ultrasonic welding stack, following the initiation of the welding, to automatically change the speed of motion of the ultrasonic stack from a speed change initiating condition, based on a predetermined value of the control variable, until a speed change terminating condition, based on a different value of the control variable.

According to another exemplary embodiment E2, one or more sensors of embodiment E1 sense a force output by the linear actuator movable element. The initiating condition is an increase in the force above a predetermined level and the terminating condition is a decrease in the force below a predetermined level.

According to yet another exemplary embodiment E3, one or more sensors of embodiment E1 sense a force output by the linear actuator movable element. The initiating condition is a decrease in the force below a predetermined level and the terminating condition is an increase in the force above a predetermined level.

According to yet another exemplary embodiment E4, one or more sensors of embodiment E1 sense a force output by the linear actuator movable element and a power input to the ultrasonic stack. The initiating condition is a first function based on input from one or more of the sensors, and the terminating condition is a second function based on input from one or more of the sensors.

According to yet another exemplary embodiment E5, one or more sensors of embodiment E1 sense a force output by the linear actuator movable element, a power input to the ultrasonic welding stack, or both the force output and the power input. The initiating condition is a first function and the terminating condition is a second function. The first function is based on input from at least one sensor, the rate of change of output from at least one sensor, or a combination thereof. The second function, which is distinct from the first function, is based on input from at least one sensor, the rate of change of output from at least one sensor, or a combination thereof.

Figure 17:
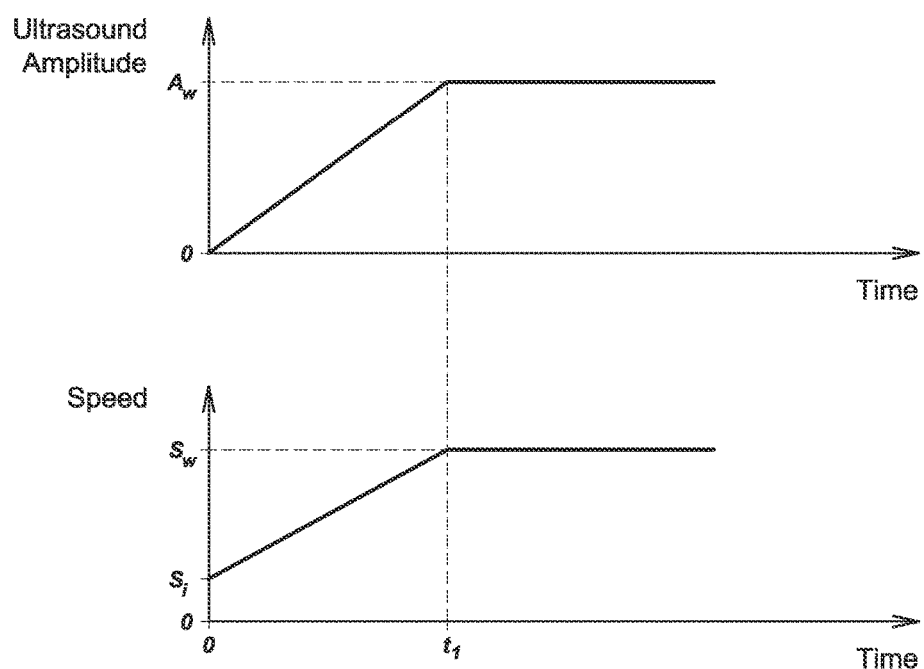
FIG. 17 shows another example of corresponding ultrasound amplitude and speed graphs plotted versus time for a weld in which speed is ramped up in direct proportion to ultrasound amplitude.

Referring to FIG. 17, yet another alternative embodiment includes speed ramp-up at the start of a weld. In a typical ultrasonic weld, the amplitude of vibration is gradually increased from zero at the start of the weld to a predetermined weld amplitude, with the rate of increase being generally constant. During the amplitude ramp-up interval, the amount of ultrasonic energy available to be transferred to the parts being welded is limited. If the press is programmed to travel at a constant speed while the amplitude is ramping up, the plastic may not melt sufficiently fast (which can cause the force between the parts to become excessively high). The motion delay techniques described above are effective ways to prevent force buildup.

However, an additional or alternative technique, which does not require a force sensor, is to gradually increase the speed from a low initial value (including zero) to the prescribed weld speed. As illustrated in FIG. 17, one example is directed to ramping up the speed in direct proportion to the actual ultrasound amplitude. According to the illustrated graphs of ultrasound amplitude and speed plotted versus time, the ultrasound amplitude is zero and the speed is at a low level Si when the ultrasonic vibrations are initiated at the start of the weld (at time "0").

As the ultrasound amplitude increases with time, the speed increases proportionally until the ultrasound amplitude reaches the weld amplitude $A_w$ and the speed simultaneously reaches a weld speed $S_w$ (at time $t_1$). Another variation of this feature is to have the speed ramp-up be a non-linear function of the amplitude (e.g., a polynomial function). The speed ramp-up function may also be a linear or a non-linear function of another sensed parameter, such as (but not limited to) ultrasound power. Although the case of a constant weld speed is depicted in FIG. 17 (as indicated after time $t_1$), this feature can be applied to welds where the speed is variable following the ramp-up period or where the press force (instead of speed) is controlled.

Similarly, the present concepts are not limited to ultrasonic welding, but may advantageously be incorporated into other welding processes and welding equipment utilizing a servo motor or actuator to drive workpieces such as, but not limited to, friction welding or diffusion welding.

According to an exemplary embodiment F1, an ultrasonic welding system includes a movable ultrasonic welding stack to move and to apply vibration energy to at least one workpiece responsive to control inputs. The system also includes a motion control system to control a motion of the ultrasonic welding stack. The system further includes a controller to provide control inputs to the motion control system associated with the ultrasonic welding stack to control movement of the ultrasonic welding stack and to control an output of the ultrasonic welding stack to the at least one workpiece. The system further includes at least one sensor to sense at least one control variable and to output at least one signal corresponding to the at least once control variable to the controller. The controller causes the ultrasonic welding stack, upon the initiation of welding, to automatically change the speed of motion of the ultrasonic stack as a function of the control variable until the control variable reaches a predetermined value.

According to another exemplary embodiment F2, the sensor of embodiment F1 senses an ultrasound amplitude of the ultrasonic welding stack. The speed is linearly proportional to the ultrasound amplitude.

According to yet another exemplary embodiment F3, the sensor of embodiment F1 senses a power input to the ultrasonic welding stack. The speed is linearly proportional to the power input.

According to yet another exemplary embodiment F4, the sensor of embodiment F1 senses an ultrasound amplitude of the ultrasonic welding stack. The speed is a non-linear function of the ultrasound amplitude.

According to yet another exemplary embodiment F5, the sensor of embodiment F1 senses a power input to the ultrasonic welding stack. The speed is a non-linear function of the power input.

According to yet another exemplary embodiment F6, one or more sensors of embodiment F1 sense one or more of a frequency of the ultrasonic stack and a phase of a transducer of the ultrasonic welding stack. The speed is a linear or non-linear function of frequency and/or phase.

According to yet another exemplary embodiment F7, one or more sensors of embodiment F1 sense one or more of an ultrasound amplitude of the ultrasonic welding stack, a power input to the ultrasonic welding stack, a frequency of the ultrasonic welding stack, and a phase of a transducer of the ultrasonic welding stack. The speed is a linear or non-linear function of any combination including one or more of the amplitude, power, frequency, phase, rate of change of amplitude, rate of change of power, rate of change of frequency, and/or rate of change of phase.

While particular implementations and applications of the present disclosure have been illustrated and described, it is to be understood that this disclosure is not limited to the precise construction and compositions disclosed herein and that various modifications, changes, and variations can be apparent from the foregoing descriptions without departing from the scope of the invention as defined in the appended claims.

What is claimed is:

1. An ultrasonic welding system comprising:
   a movable ultrasonic welding stack to apply vibrational energy, in response to control inputs, to at least one workpiece;
   a motion control system including an electrically powered actuator or motor that directly control the speed of advancing movement of the ultrasonic welding stack relative to said workpiece, based on at least one control variable; and
   a controller providing control inputs to the motion control system and causing, following initiation of a welding operation, an automatic change of speed of said advancing movement of the ultrasonic welding stack, when the at least one control variable reaches a predetermined value.

2. The ultrasonic welding system of claim 1, wherein the automatic change of speed occurs multiple times during a single welding operation.

3. The ultrasonic welding system of claim 1, which includes one or more sensors, one of said sensors senses an ultrasound amplitude of the ultrasonic welding stack, and the speed of said advancing movement of the ultrasonic welding stack is linearly proportional to the ultrasound amplitude.

4. The ultrasonic welding system of claim 1, which includes one or more sensors, one of said sensors senses a power input to the ultrasonic welding stack, and wherein the speed of said advancing movement of the ultrasonic welding stack is linearly proportional to the power input.

5. The ultrasonic welding system of claim 1, which includes one or more sensors, one of said sensors senses an ultrasound amplitude of the ultrasonic welding stack, and wherein the speed of said advancing movement of the ultrasonic welding stack is a non-linear function of the ultrasound amplitude.

6. The ultrasonic welding system of claim 1, which includes one or more sensors, one of said sensors senses a power input to the ultrasonic stack, and wherein the speed of said advancing movement of the ultrasonic welding stack is a non-linear function of the power input.

7. The ultrasonic welding system of claim 1, which includes one or more sensors, one of said sensors senses a frequency of the ultrasonic welding stack and a phase of a transducer of the ultrasonic welding stack, and wherein the speed of said advancing movement of the ultrasonic welding stack is a linear or non-linear function of at least one of the frequency and the phase.

8. The ultrasonic welding system of claim 1, which includes one or more sensors that sense an ultrasound amplitude of the ultrasonic welding stack, a power input to the ultrasonic welding stack, a frequency of the ultrasonic welding stack, and a phase of a transducer of the ultrasonic welding stack, and wherein the speed of said advancing movement of the ultrasonic welding stack is a linear or non-linear function of one or more parameters selected from a group of amplitude, power, frequency, phase, rate of change of amplitude, rate of change of power, rate of change of frequency, and rate of change of phase.

9. The ultrasonic welding system of claim 1, wherein the at least one control variable is a force on the at least one workpiece, the function of the at least one control variable including automatically changing the speed of said advancing movement from an occurrence of a speed change initiating condition, based on a predetermined value of a rate of change of force, until an occurrence of a speed change terminating condition, based on a different value of the rate of change of force.

10. The ultrasonic welding system of claim 9, wherein the speed change initiating condition is selected from a group consisting of:
    (a) an increase in the rate of change of force above a predetermined level, the automatic change of the speed of said advancing movement including reducing the speed to a fraction of a programmed speed or to zero; and
    (b) a decrease in the rate of change of force below a predetermined level, the automatic change of the speed of said advancing movement including increasing the speed by a factor larger than one relative to a programmed speed.

11. The ultrasonic welding system of claim 9, wherein the speed change terminating condition is selected from a group consisting of:
    (a) a decrease in the rate of change of force below a predetermined level;
    (b) an increase in the rate of change of force above a predetermined level; and
    (c) a return of the rate of change of force to a level corresponding to the speed change initiating condition.

12. The ultrasonic welding system of claim 1, wherein the function of the at least one control variable includes automatically changing the speed of said advancing movement from a speed change initiating condition, based on an initial level of the predetermined value of the at least one control variable, until a speed change terminating condition, based on a different level of the predetermined value of the at least one control variable.

13. The ultrasonic welding system of claim 12, which includes one or more sensors, one of which senses a force output by a linear actuator movable element, the speed change initiating condition being an increase in the force to a predetermined level and the speed change terminating condition being a decrease in the force to a predetermined level.

14. The ultrasonic welding system of claim 12, which includes one or more sensors, one of which senses a force output by a linear actuator movable element, the speed change initiating condition being a decrease in the force to a predetermined level and the speed change terminating condition being an increase in the force to a predetermined level.

15. The ultrasonic welding system of claim 12, which includes one or more sensors that sense one or more parameters selected from a group consisting of (a) a force output by a linear actuator movable element, (b) a power input to the ultrasonic welding stack, and (c) a rate of change of at least one of the one or more parameters, the speed change initiating condition being a first function based on input received from at least one of the one or more sensors, and the speed change terminating condition being a second function based on input received from at least one of the one or more sensors.

16. A method for a welding operation, the method comprising:
- initiating a welding operation by moving, in response to control inputs, an ultrasonic welding stack to apply vibrational energy to a workpiece;
- causing, via a controllable motion control system, controlled advancing movement of the ultrasonic welding stack toward said workpiece based on at least one control variable, the controllable motion control system including an electrically powered actuator or motor that directly controls the advancing movement of the ultrasonic welding stack; and
- in response to control inputs received from a controller and based on the control variable, causing, following initiation of a welding operation, an automatic change of speed of the controlled advancing movement of the ultrasonic welding stack when the at least one control variable reaches a predetermined value.

17. The method of claim 16, wherein the causing of the automatic change of speed occurs multiple times during a single welding operation.

18. The method of claim 16, further comprising sensing via one or more sensors a parameter selected from a group consisting of (a) an ultrasound amplitude of the ultrasonic welding stack, (b) a power input to the ultrasonic welding stack, (c) a frequency of vibration of the ultrasonic welding stack, and (d) a phase of a transducer of the ultrasonic welding stack.

19. The method of claim 18, wherein said speed of advancing movement of the ultrasonic welding stack is a linear or non-linear function of one or more of the sensed parameters.

20. The method of claim 16, further comprising automatically changing the speed of advancing movement of the ultrasonic welding stack from an occurrence of a speed change initiating condition, based on a predetermined value of a rate of change of force, until an occurrence of a speed change terminating condition, based on a different value of the rate of change of force, the at least one control variable being a force on the at least one workpiece.

21. The method of claim 20, wherein the speed change initiating condition is selected from a group consisting of:
- (a) an increase in the rate of change of force above a predetermined level, the automatic change of the speed of said advancing movement including reducing the speed to a fraction of a programmed speed or to zero; and
- (b) a decrease in the rate of change of force below a predetermined level, the automatic change of the speed of said advancing movement including increasing the speed by a factor larger than one relative to a programmed speed.

22. The method of claim 20, wherein the speed change terminating condition is selected from a group consisting of
- (a) a decrease in the rate of change of force below a predetermined level;
- (b) an increase in the rate of change of force above a predetermined level; and
- (c) a return of the rate of change of force to a level corresponding to the speed change initiating condition.

23. The method of claim 16, further comprising automatically changing the speed of motion from an occurrence of a speed change initiating condition, based on an increase in a sensed force to a predetermined level, until an occurrence of a speed change terminating condition, based on a decrease in the sensed force to a predetermined level.

24. The method of claim 16, further comprising automatically changing the speed of motion from an occurrence of a speed change initiating condition, based on a decrease in a sensed force to a predetermined level, until an occurrence of a speed change terminating condition, based on an increase in the sensed force to a predetermined level.

25. The method of claim 16, further comprising:
- sensing via one or more sensors at least one parameter selected from a group consisting of (a) a force output by the liner actuator movable element, and (b) a power input to the ultrasonic welding stack; and
- automatically changing the speed of said advancing movement from an occurrence of a speed change initiating condition until an occurrence of a speed change terminating condition, the speed change initiating condition being a first function that is based on one or more of the at least one parameter and a rate of change of the at least one parameter, the speed change terminating condition being a second function that is based on one or more of the at least one parameter and the rate of change of the at least one parameter.

26. The ultrasonic welding system of claim 1, wherein the at least one control variable is time.

27. The method of claim 16, wherein the at least one control variable is time.

* * * * *

UNITED STATES PATENT AND TRADEMARK OFFICE
CERTIFICATE OF CORRECTION

PATENT NO. : 9,914,263 B2  
APPLICATION NO. : 14/472084  
DATED : March 13, 2018  
INVENTOR(S) : Leo Klinstein et al.

Page 1 of 1

It is certified that error appears in the above-identified patent and that said Letters Patent is hereby corrected as shown below:

In the Claims

At Column 19, Line 17 (Claim 1, Line 6), please delete "control" and insert --controls-- therefor.

At Column 22, Line 30 (Claim 25, Line 4), please delete "the liner actuator" and insert --a linear actuator-- therefor.

Signed and Sealed this  
Fifth Day of June, 2018

Andrei Iancu  
*Director of the United States Patent and Trademark Office*